US012666322B2

(12) United States Patent
Lyu et al.

(10) Patent No.: US 12,666,322 B2
(45) Date of Patent: Jun. 23, 2026

(54) METHOD, TERMINAL DEVICE AND NETWORK DEVICE FOR NON-TERRESTRIAL NETWORK SATELLITE HANDOVER

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/273,098

(22) Filed: Jul. 17, 2025

(65) Prior Publication Data

US 2025/0344115 A1    Nov. 6, 2025

Related U.S. Application Data

(63) Continuation of application No. PCT/CN2023/116139, filed on Aug. 31, 2023.

(51) Int. Cl.
*H04W 4/00* (2018.01)
*H04B 7/06* (2006.01)
(Continued)

(52) U.S. Cl.
CPC .. *H04W 36/00725* (2023.05); *H04B 7/06952* (2023.05); *H04W 52/367* (2013.01)

(58) Field of Classification Search
CPC .......... H04W 36/00725; H04W 52/367; H04B 7/06952
(Continued)

(56) References Cited

U.S. PATENT DOCUMENTS

| 11,445,458 B2 * | 9/2022 | Jeon | ................... H04B 7/06952 |
| 12,047,890 B2 * | 7/2024 | Jeon | ................... H04W 56/001 |
(Continued)

FOREIGN PATENT DOCUMENTS

| EP | 4152824 A1 * | 3/2023 | ............... H04B 7/15 |
| EP | 4440196 A1 * | 10/2024 | ...... H04W 36/00725 |
(Continued)

OTHER PUBLICATIONS

Huawei et al., "Remaining issues on RACH-less HO in NTN," 3GPP TSG-RAN WG2 Meeting #123, R2-2308032, Toulouse, France, Aug. 21-25, 2023, 4 pages.
(Continued)

*Primary Examiner* — Marceau Milord
(74) *Attorney, Agent, or Firm* — Fish & Richardson P.C.

(57) ABSTRACT

A method, a terminal device and a network device for non-terrestrial network satellite handover are provided according to the present disclosure. One example method includes: sending first information to a first satellite network, wherein the first information comprises a plurality of first measurement results of the terminal device measuring reference signals of a plurality of beams of a second satellite network; and receiving a first handover command from the first satellite network, wherein the first handover command indicates the terminal device to perform a random access channel-less (RACH-less) satellite handover from a coverage area of the first satellite network to a coverage area of the second satellite network, wherein the first handover command comprises information of a first beam that includes at least one beam, wherein the first beam relates to one or more pre-configured resources for the RACH-less satellite handover.

19 Claims, 5 Drawing Sheets

(51) Int. Cl.
    *H04W 36/00*     (2009.01)
    *H04W 52/36*     (2009.01)
(58) Field of Classification Search
    USPC ........................................................ 370/331
    See application file for complete search history.

(56)              References Cited

U.S. PATENT DOCUMENTS

| | | | |
|---|---|---|---|
| 2021/0058837 A1* | 2/2021 | Cirik | H04B 7/0696 |
| 2021/0345410 A1* | 11/2021 | Zhou | H04W 52/50 |
| 2023/0013190 A1* | 1/2023 | Jeon | H04W 76/30 |
| 2023/0247502 A1* | 8/2023 | Cirik | H04B 7/088 |
| | | | 375/262 |
| 2023/0354236 A1* | 11/2023 | Matsuda | H04W 56/005 |
| 2024/0334281 A1* | 10/2024 | Khoshkholgh Dashtaki | H04W 36/083 |
| 2025/0080214 A1* | 3/2025 | Ravishankar | H04B 7/18519 |

FOREIGN PATENT DOCUMENTS

| | | | | |
|---|---|---|---|---|
| WO | WO-2024206902 A2 * | 10/2024 | ......... | H04W 56/001 |
| WO | WO-2024234002 A2 * | 11/2024 | ......... | H04B 7/18541 |
| WO | WO-2025049526 A1 * | 3/2025 | ......... | H04L 12/1836 |

OTHER PUBLICATIONS

International Search Report and Written Opinion in International Appln. No. PCT/CN2023/116139, mailed on Apr. 30, 2024, 10 pages (with partial English translation).
LG Electronics Inc et al. "Discussion on handover enhancements," 3GPP TSG-RAN WG2 Meeting #123, R2-2307219, Toulouse, France, May 21-25, 2023, 3 pages.
Vivo et al., "Discussions on RAN2 Ls on RACH-less Handover," 3GPP TSG RAN WG1 #114, R1-2306706, Toulouse, France, Aug. 21-25, 2023, 5 pages.

* cited by examiner

100

200

300

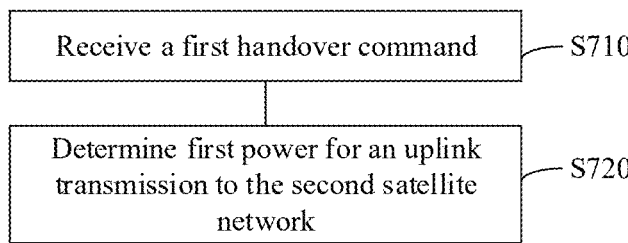
FIG. 7
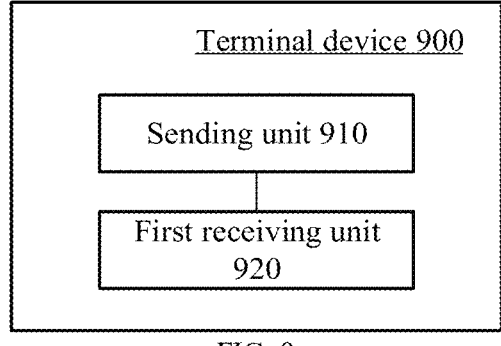
FIG. 8
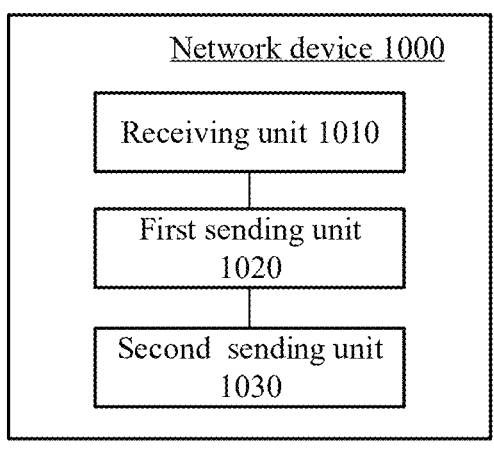
FIG. 9
FIG. 10

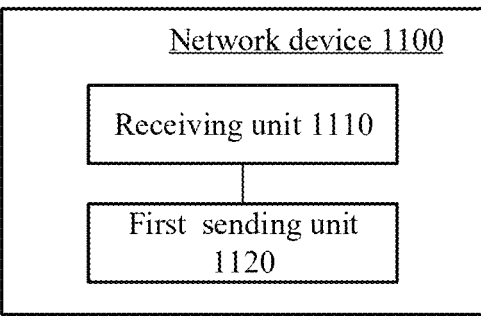
FIG. 11
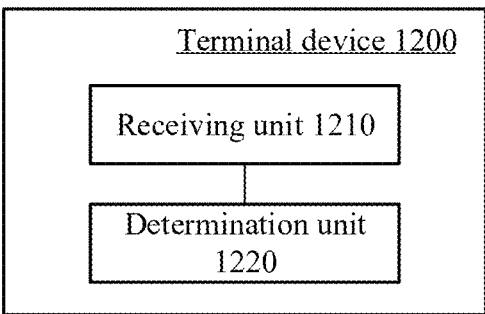
FIG. 12
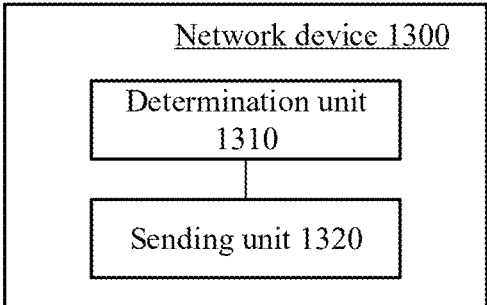
FIG. 13
Network device 1400
Sending unit 1410
FIG. 14

METHOD, TERMINAL DEVICE AND NETWORK DEVICE FOR NON-TERRESTRIAL NETWORK SATELLITE HANDOVER

CROSS-REFERENCE TO RELATED APPLICATIONS

This application is a continuation of International Application No. PCT/CN2023/116139, filed on Aug. 31, 2023, the disclosure of which is hereby incorporated by reference in its entirety.

TECHNICAL FIELD

The present disclosure relates to the technical field of communication, and in particular to a method, a terminal device and a network device for non-terrestrial network satellite handover.

BACKGROUND

In order to improve the user experience and reduce the time delay of a terminal device handing over from a source cell to a target cell, a random access channel-less (RACH-less) is introduced.

However, in some communication systems (e.g., non-terrestrial network (NTN) systems), the propagation delay between a terminal device and a network device is relatively large. When a RACH-less handover is performed in the communication systems, how to pre-configure uplink resources to improve the handover success rate of the terminal device is a problem to be solved.

SUMMARY

A method, a terminal device and a network device for non-terrestrial network satellite handover are provided according to the present disclosure. Various aspects involved in the embodiments of the present disclosure are described below.

In a first aspect, A method for non-terrestrial network satellite handover is provided, which is applied to a satellite handover from a coverage area of a first satellite network to a coverage area of a second satellite network. The method includes: sending first information, where the first information is used by the second satellite network to determine a first beam corresponding to a terminal device, and the first beam includes at least one beam; and receiving a first handover command, where the first handover command is configured to instruct the terminal device to perform the satellite handover. The first beam is related to a first resource and/or a second resource pre-configured by the second satellite network for the satellite handover.

In a second aspect, A method for non-terrestrial network satellite handover is provided, which is applied to a satellite handover from a coverage area of a first satellite network to a coverage area of a second satellite network. The method includes: receiving first information sent by a terminal device, where the first information is used by the second satellite network to determine a first beam corresponding to the terminal device, and the first beam includes at least one beam; sending the first information to the second satellite network; and sending a first handover command to the terminal device, where the first handover command is configured to instruct the terminal device to perform the satellite handover. The first beam is related to a first resource and/or a second resource pre-configured by the second satellite network for the satellite handover.

In a third aspect, A method for non-terrestrial network satellite handover, which is applied to a satellite handover from a coverage area of a first satellite network to a coverage area of a second satellite network. The method includes: receiving first information sent by the first satellite network, where the first information is used by the second satellite network to determine a first beam corresponding to a terminal device, and the first beam includes at least one beam; and sending a handover request acknowledge to the first satellite network according to a handover request sent by the first satellite network, where the handover request acknowledge is used by the first satellite network to send a first handover command to the terminal device, and the first handover command is configured to instruct the terminal device to perform the satellite handover. The first beam is related to a first resource and/or a second resource pre-configured by the second satellite network for the satellite handover.

In a fourth aspect, a terminal device is provided, which includes: a sending unit, configured to send first information, where the first information is used by a second satellite network to determine a first beam corresponding to a terminal device, and the first beam includes at least one beam; and a first receiving unit, configured to receive a first handover command, where the first handover command is configured to instruct the terminal device to perform the satellite handover from a coverage area of a first satellite network to a coverage area of the second satellite network. The first beam is related to a first resource and/or a second resource pre-configured by the second satellite network for the satellite handover.

In a fifth aspect, a network device is provided, the network device is a network device corresponding to a first satellite network, and the network device includes: a receiving unit, configured to receive first information sent by a terminal device; a first sending unit, configured to send the first information to a second satellite network, where the first information is used by the second satellite network to determine a first beam corresponding to the terminal device, and the first beam includes at least one beam; and a second sending unit, configured to send a first handover command to the terminal device, where the first handover command is configured to instruct the terminal device to perform the satellite handover from a coverage area of the first satellite network to a coverage area of the second satellite network. The first beam is related to a first resource and/or a second resource pre-configured by the second satellite network for the satellite handover.

In a sixth aspect, a network device is provided, the network device is a network device corresponding to a second satellite network, and the network device includes: a receiving unit, configure to receive first information sent by a first satellite network, where the first information is used by the second satellite network to determine a first beam corresponding to a terminal device, and the first beam includes at least one beam; and a first sending unit, configured to send a handover request acknowledge to the first satellite network according to a handover request sent by the first satellite network, where the handover request acknowledge is used by the first satellite network to send a first handover command to the terminal device, and the first handover command is configured to instruct the terminal device to perform the satellite handover from a coverage area of the first satellite network to a coverage area of the second satellite network. The first beam is related to a first resource and/or a second resource pre-configured by the second satellite network for the satellite handover.

In a seventh aspect, a communication device is provided, which includes a memory and a processor, the memory is configured to store a program, and the processor is configured to call the program from the memory to execute the method according to any one of the first aspect to the third aspect.

In an eighth aspect, a device is provided, which includes a processor configured to call a program from a memory, to execute the method according to any one of the first aspect to the third aspect.

In a ninth aspect, a chip is provided, which includes a processor, configured to call a program from a memory, to cause a device mounted with the chip to execute the method according to any one of the first aspect to the third aspect.

In a tenth aspect, a computer-readable storage medium is provided, and a program is stored on the computer-readable storage medium, to cause a computer to execute the method according to any one of the first aspect to the third aspect.

In an eleventh aspect, a computer program product is provided, which includes a program causing a computer to execute the method according to any one of the first aspect to the third aspect.

In a twelfth aspect, a computer program is provided, which causes a computer to execute the method according to any one of the first aspect to the third aspect.

In the embodiments of the present disclosure, before receiving the first handover command, the terminal device can send the first information to the second satellite network, so as to determine the first beam corresponding to the terminal device shared by the second satellite network and the terminal device. The second satellite network pre configures the first resource and/or the second resource according to the determined first beam. It can be seen that the terminal device can know the first beam carrying the first resource grant, thereby improving the access success rate of handover using the first resource.

BRIEF DESCRIPTION OF THE DRAWINGS

FIG. 7 is a schematic flowchart of another method for non-terrestrial network satellite handover.

FIG. 8 is a schematic diagram of a possible implementation for determining a handover path loss of a terminal device.

FIG. 9 is a schematic structural diagram of a terminal device according to an embodiment of the present disclosure.

FIG. 10 is a schematic structural diagram of a network device according to an embodiment of the present disclosure.

FIG. 11 is a schematic structural diagram of another network device according to an embodiment of the present disclosure.

FIG. 12 is a schematic structural diagram of another terminal device according to an embodiment of the present disclosure.

FIG. 13 is a schematic structural diagram of another network device according to an embodiment of the present disclosure.

FIG. 14 is a schematic structural diagram of another network device according to an embodiment of the present disclosure.

DETAILED DESCRIPTION OF THE EMBODIMENTS

Figure 1:
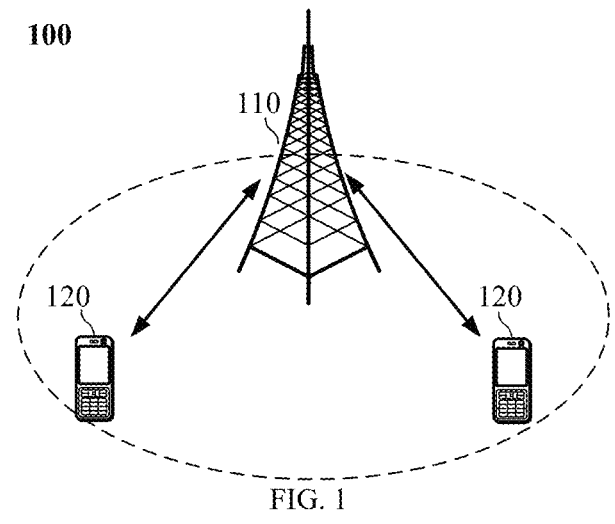
FIG. 1 is a wireless communication system applied to an embodiment of the present disclosure.

The technical solutions in the embodiments of the present disclosure will be described below in combination with the accompanying drawings in the embodiments of the present disclosure. Apparently, the described embodiments are part of the embodiments of the present disclosure, rather than all of them. For the embodiments in the present disclosure, all other embodiments obtained by those skilled in the art without creative efforts shall fall in the protection scope of the present disclosure.

The embodiments of the present disclosure can be applied to various communication systems. For example, the embodiments of the present disclosure can be applied to a global system of mobile communication (GSM) system, a code division multiple access (CDMA) system, a wideband code division multiple access (WCDMA) system, a general packet radio service (GPRS), a long term evolution (LTE) system, an advanced long-term evolution (LTE-A) system, a new radio (NR) system, an evolution systems of a NR system, a LTE-based access to unlicensed spectrum (LTE-U) system, an NR-based access to unlicensed spectrum (NR-U) system, a universal mobile telecommunication system (UMTS), wireless local area networks (WLAN), wireless fidelity (WiFi) and a 5th-generation (5G) system. The embodiments of the present disclosure can also be applied to other communication systems, such as future communication systems. The future communication system may be, for example, a 6th-generation (6G) mobile communication system, or a satellite communication system.

Conventional communication systems have a limited number of supported connections and are relatively easy to implement. However, with the development of communication technology, communication systems can support not only conventional cellular communication but also one or more other types of communication. For example, a communication system can support one or more of the following types of communication: device to device (D2D) communication, machine to machine (M2M) communication, machine type communication (MTC), enhanced MTC (eMTC), vehicle to vehicle (V2V) communication, and vehicle to everything (V2X) communication. The embodiments of the present disclosure can also be applied to communication systems that support the above-mentioned communication modes.

The communication systems in the embodiments of the present disclosure can be applied to the carrier aggregation (CA) scenario, the dual connectivity (DC) scenario, and the standalone (SA) networking scenario.

The communication systems in the embodiments of the present disclosure can be applied to unlicensed spectrum. The unlicensed spectrum can also be regarded as shared spectrum. Alternatively, the communication systems in the embodiments of the present disclosure can be applied to licensed spectrum. The licensed spectrum can also be regarded as a dedicated spectrum.

The embodiments of the present disclosure can be applied to an NTN system. As an example, the NTN system may include an NTN system based on 4G, an NTN system based on NR, an NTN system based on internet of things (IoT) and an NTN system based on narrow band internet of things (NB-IoT).

A communication system may include one or more terminal devices. The terminal device mentioned in the embodiments of the present disclosure can also be referred to as user equipment (UE), access terminal, user unit, user station, mobile station (MS), mobile Terminal (MT), remote station, remote terminal, mobile device, user terminal, terminal, wireless communication device, user agent or user device, etc.

In some embodiments, the terminal device may be a STATION (ST) in a WLAN. In some embodiments, the terminal device may be a cellular phone, a cordless phone, a session initiation protocol (SIP) phone, a wireless local loop (WLL) station, a personal digital assistant, PDA) device, a handheld device with wireless communication function, a computing device or other processing devices connected to wireless modems, a vehicle-mounted device, a wearable device, a terminal device in the next generation communication system (such as NR system), or a terminal device in the future evolved public land mobile network (PLMN).

In some embodiments, the terminal device may be a device that provides voice and/or data connectivity to a user. For example, the terminal device can be a handheld device with wireless connection function, a vehicle-mounted device, and the like. As some concrete examples, the terminal device can be a mobile phone, a Pad, a notebook computer, a personal digital assistant (PDA), a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, and a wireless terminal in smart home, etc.

In some embodiments, the terminal device can be deployed on land. For example, the terminal device can be deployed indoors or outdoors. In some embodiments, the terminal device can be deployed on the water surface, such as on a ship. In some embodiments, the terminal device can be deployed in the air, such as on an aircraft, a balloon, or a satellite.

In addition to the terminal device, the communication system may include one or more network devices. The network device in the embodiments of the present disclosure is a device for communicating with the terminal device, which be referred to as an access network device or a radio access network device. For example, the network device can be a base station. The network device in the embodiments of the present disclosure can refer to a radio access network (RAN) node (or device) that connects the terminal device to the wireless network. The base station can broadly cover various names as follows, or can be replaced with the following names, such as: NodeB, evolved NodeB (eNB), next generation NodeB (gNB), relay station, access point, transmitting and receiving Point (TRP), transmitting point (TP), master evolved NodeB (MeNB), secondary evolved NodeB (SeNB), multi-standard radio (MSR) node, home base station, network controller, access node, wireless node, access point (AP), transmission node, transceiver node, base band unit (BBU), remote radio unit (RRU), active antenna unit (AAU), remote radio head (RRH), central unit (CU), distributed unit (DU), positioning node, etc. The base station can be a macro base station, a micro base station, a relay node, a donor node, or the like, or a combination thereof. The base station can also refer to a communication module, a modem, or a chip installed in the aforementioned device or equipment. The base station can also be a mobile switching center, a device that undertakes the functions of a base station in D2D, V2X, M2M communications, a network-side device in a 6G network, a device that undertakes the functions of a base station in a future communication system, etc. The base station can support networks with the same or different access technologies. The embodiments of the present disclosure do not limit the specific technology and specific device form adopted by the network device.

The base station can be fixed or mobile. For example, a helicopter or a drone can be configured as a mobile base station, and one or more cells can move according to the position of the mobile base station. In other examples, a helicopter or a drone can be configured as a device to communicate with another base station.

In some examples, the network device according to the embodiments of the present disclosure can be CU or DU, or the network device can include both CU and DU. gNB can further include AAU.

By way of example and not limitation, in the embodiments of the present disclosure, the network device may have mobility characteristics. For example, the network device can be a mobile device. In some embodiments of the present disclosure, the network device can be a satellite or a balloon station. In some other embodiments of the present disclosure, the network device can also be a base station located on land, in water areas, or other places.

In the embodiments of the present disclosure, the network device can provide services for a cell. The terminal device communicates with the network device via the transmission resources (such as frequency-domain resources, or spectrum resources) used by the cell. The cell can be a cell corresponding to the network device (such as a base station). The cell can belong to a macro base station or a base station corresponding to a small cell. Herein, the small cell can include metro cell, micro cell, pico cell, femto cell, etc. The small cells have the characteristics of small coverage area and low transmission power, and are suitable for providing high-rate data transmission services.

Exemplarily, FIG. 1 is a schematic diagram of an architecture of a communication system provided by an embodiment of the present disclosure. As shown in FIG. 1, the communication system 100 includes a network device 110, which can be a device for communicating with a terminal device 120 (or referred to as a communication terminal or a terminal). The network device 110 can provide communication coverage for a specific geographical area and can communicate with terminal devices located in the coverage area.

FIG. 1 exemplarily shows one network device and two terminal devices. In some embodiments of the present disclosure, the communication system 100 may include multiple network devices, and the coverage area of each network device may include terminal devices with other number, which is not limited by the embodiments of the present disclosure.

Figure 2:
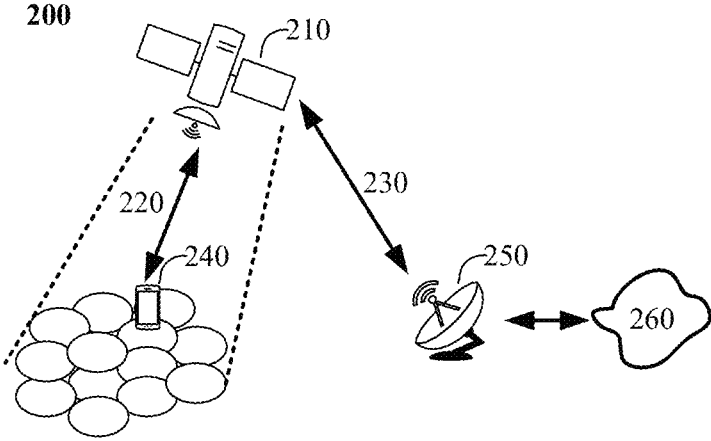
FIG. 2 is an NTN system applied to an embodiment of the present disclosure.

Exemplarily, FIG. 2 is a schematic diagram of an architecture of the NTN system mentioned above. The NTN system 200 shown in FIG. 2 uses a satellite 210 as an aerial platform. As shown in FIG. 2, the satellite radio access network includes a satellite 210, a service link 220, a feeder link 230, a terminal device 240, a gateway (GW) 250, and a network 260 including a base station and a core network 260.

The satellite 210 is a spacecraft based on a space platform. The service link 220 refers to the link between the satellite 210 and the terminal device 240. The feeder link 230 refers to the link between the gateway 250 and the satellite 210. The earth-based gateway 250 connects the satellite 210 to a base station or a core network, depending on the selection of architecture.

The NTN architecture shown in FIG. 2 is a bent-pipe transponder architecture. In the architecture, the base station is located on the earth behind the gateway 250, and the satellite 210 acts as a relay. The satellite 210 operates as a repeater that forwards the signal of the feeder link 230 to the service link 220, or forwards the signal of the service link 220 to the feeder link 230. That is to say, the satellite 210 does not have the functions of a base station, and the communication between the terminal device 240 and the base station in the network 260 can be relayed through the satellite 210.

Figure 3:
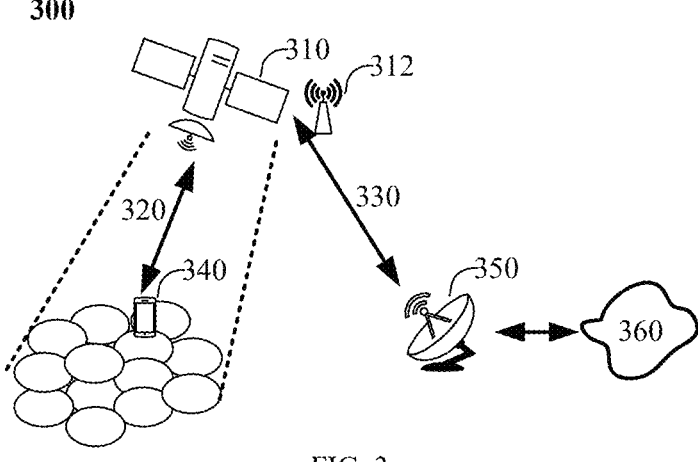
FIG. 3 is another NTN system applied to an embodiment of the present disclosure.

Exemplarily, FIG. 3 is a schematic diagram of another architecture of the NTN system. As shown in FIG. 3, the satellite radio access network 300 includes a satellite 310, a service link 320, a feeder link 330, a terminal device 340, a gateway 350, and a network 360. Different from FIG. 2, there is a base station 312 on the satellite 310, and the network 360 behind the gateway 350 only includes a core network.

The NTN architecture shown in FIG. 3 is a regenerative transponder architecture. In the architecture, the satellite 310 is provided with a base station 312 and can be directly connected to the earth-based core network through a link. The satellite 310 has the functions of a base station, and the terminal device 340 can communicate directly with the satellite 310. Therefore, the satellite 310 can be referred to as a network device.

The communication systems with the architectures shown in FIG. 2 and FIG. 3 may include multiple network devices, and the coverage area of each network device can include terminal devices with other number, which is not limited by the embodiments of the present disclosure.

In the embodiments of the present disclosure, any of the communication systems in FIG. 1 to FIG. 3 may include other network entities such as a mobility management entity (MME) and an access and mobility management function (AMF), which is not limited by the embodiments of the present disclosure.

It should be understood that, in the embodiments of the present disclosure, devices with communication functions in the network/system can be referred to as communication devices. Taking the communication system 100 shown in FIG. 1 as an example, the communication device includes the network device 110 and the terminal devices 120 with communication functions. The network device 110 and the terminal devices 120 can be the specific devices described above, which will not be described herein. The communication device can also include other devices in the communication system 100, such as a network controller, a mobility management entity, and other network entities, which is not limited by the embodiments of the present disclosure.

In order to facilitate understanding, some related technical knowledge involved in the embodiments of the present disclosure will be introduced first. The following related technologies, as optional solutions, can be combined with the technical solutions of the embodiments of the present disclosure in any way, and all of them fall in the protection scope of the embodiments of the present disclosure. The embodiments of the present disclosure include at least some of the following content.

NTN System

With the development of communication technologies, communication systems (such as 5G) will integrate the market potential of satellite and terrestrial network infrastructure. For example, NTN, including the satellite segment, becomes a recognized part of the 3rd generation partnership project (3GPP) 5G connection infrastructure by the 5G standard.

NTN refers to a network or network segment that uses radio frequency (RF) resources on a satellite or an unmanned aerial system (UAS) platform. Taking satellites as an example, communication satellites are classified into low earth orbit (LEO) satellites, medium earth orbit (MEO) satellites, geostationary earth orbit (GEO) satellites, high elliptical orbit (HEO) satellites, etc., according to different orbital altitudes. Among them, LEO is an earth-centered orbit with an altitude of 2000 kilometers or less, or at least 11.25 periods per day and an eccentricity of less than 0.25. Most artificial objects in outer space are located in LEO. The LEO satellite orbits the earth at high speed (mobility) but in a predictable or determined orbit.

Satellites with different orbital altitudes have different orbital periods.

LEO: the typical altitude ranges from 250 kilometer to 1500 kilometers, and the orbital period ranges from 90 minutes to 120 minutes.

MEO: the typical altitude ranges from 5000 kilometers to 25000 kilometers, and the orbital period ranges from 3 hours to 15 hours.

GEO: The altitude is substantially 35786 kilometers, and the orbital period is 24 hours.

As can be seen from FIG. 2 and FIG. 3, which takes a satellite as an example, the typical scenario of an NTN system accessing a terminal device involves an NTN transparent payload or an NTN regenerative payload. The bent-pipe transponder architecture shown in FIG. 2 corresponds to the NTN transparent payload, and the regenerative transponder architecture shown in FIG. 3 corresponds to the NTN regenerative payload.

In the NTN system, the propagation delay between the terminal device and the network device mainly depends on the altitude of the spaceborne or the airborne platform and the type of payload in the NTN. Compared with the terrestrial network (TN), the propagation delay between the terminal device and the network device in the NTN system is much longer. For example, in the cellular network used in conventional NR, the propagation delay of the terrestrial mobile system is generally less than 1 millisecond, and the propagation delay of the NTN system ranges from several milliseconds to hundreds of milliseconds.

The NTN system has strong mobility, and the aerial platforms such as satellites cover a large area, so the terminal devices need to perform cell handover in time to maintain stable communication. For the sake of simplicity, satellites will be taken as an example for description hereinafter.

In the NTN system, as the satellite moves, the terminal device needs to perform a satellite handover from a source NTN satellite (NTN1) to a target NTN satellite (NTN2). During the handover process, the terminal device generally activates two timers to enhance the timing relationship. The two timers are timer T304 and timer T430 respectively.

When the terminal device starts the handover process, it initiates the timer T304. During the handover, once the timer T304 expires, the terminal device initiates a radio resource control (RRC) connection re-establishment process to the target NTN cell.

During the process of performing downlink (DL) and uplink (UL) synchronization, the terminal device starts the timer T430. It can be seen that the source satellite NTN1 and the terminal device on the earth move relatively. Therefore, the auxiliary information (NTN-config) of the source satellite NTN1 involves a problem of validity. The timer T430 is configured to ensure that the terminal device can continuously obtain the valid auxiliary information of the source satellite NTN1. For example, the timer T430 can be used to control the terminal device to obtain the valid clock auxiliary information in system information block (SIB) 19, so as to ensure that the auxiliary information of the source NTN1 obtained by the terminal device remains valid before the handover is completed.

The auxiliary information of the source satellite NTN1 includes, for example, satellite ephemeris and common timing advance (TA) parameters. For the NTN1, the network side can broadcast the ephemeris information and the common TA (common TA) parameters. For example, the satellite auxiliary information for NTN access is included in SIB19. Before accessing NTN2, the terminal device has a valid global navigation satellite system (GNSS) position, the satellite ephemeris information and the common TA.

RACH-Less Handover (HO)

When the source cell, the target cell and the terminal device are synchronized, a handover solution with random access channel-less (RACH-less) can be introduced to reduce the handover delay and improve the user experience. In a synchronization network, it can be assumed that subframe boundaries between the source cell and the target cell are aligned. Therefore, the terminal device can hand over from the source cell to the target cell at the time agreed upon by the three parties, without the need for a random access process. For example, when the source cell, the target cell and the terminal device are synchronized, the terminal device can hand over from the source cell to the target cell at the system frame number (SFN) agreed upon by the three parties, without the need for random access.

One of the main purposes of the random access channel (RACH) process in the handover process is to obtain the TA of the target cell. Under the condition of RACH handover, the terminal device can obtain the TA in the target cell by the RACH process. In the absence of the RACH process, when the source cell and the target cell are synchronized in time, the terminal device can obtain the TA of the target cell without an explicit TA command.

Another purpose of the RACH process during the handover is to obtain the uplink grant for transmission. In a case where there is no RACH process in the target cell, an uplink grant needs to be allocated in the target cell. In some embodiments, for the initial UL transmission in the RACH-less handover, a pre-allocated grant in the RACH-less handover command is supported. That is to say, the target cell can perform pre-allocation through the uplink grant (UL-grant) in the handover command. The pre-allocated UL-grant can remain valid for a period of time, starting from the synchronization of the terminal device with the target cell. For example, when a RACH-less handover is performed in the NR terrestrial network, the propagation delay between the terminal device and the network device is relatively low. According to the propagation delay information between the terminal device and the network device, the target cell can appropriately configure the time-domain position of the uplink resources in the handover command, so that the terminal device can send the RRC Reconfiguration Complete message (that is, the handover completion message) when accessing the target cell.

For the initial UL transmission in the RACH-less handover, it is necessary to support the pre-allocated grants in the RACH-less handover command. In the NTN system, whether the handover occurs in satellites with the same feeder link or in satellites with different feeder links, the RACH-less handover in the NTN can be supported. Herein, the satellites with the same feeder link refer to the satellites that share the same gateway or the same network device (e.g., gNB).

Compared with the cellular network used in some communication systems (such as NR), the propagation delay between the terminal device and the satellite in the NTN is relatively large, and the propagation delay of the air interface for the terminal device to correctly receive the handover command is also large. When the RACH-less handover is introduced in the NTN system, due to the large propagation delay, the terminal device may miss the configured uplink resources during the process of accessing the target cell, resulting in the failure of the handover access. For example, in the RACH-less handover in the NTN, regarding the delay of the handover command from the target satellite to the terminal device, the source satellite may also experience the retransmission of radio link control (RLC) layer repeat or hybrid automatic repeat reQuest (HARQ) when forwarding the handover command, which increases the propagation delay of the air interface of the terminal device, resulting in unsuccessfully access.

In some scenarios, the NTN, similar to other communication systems (such as 5G (NR)), achieves coverage based on beams. For example, each serving cell has one or more beams carrying synchronization signal blocks (SSBs) or synchronization signal and physical broadcast channel signal blocks (SS/PBCH blocks). For the sake of brevity, SSB can represent both the synchronization signal block and the synchronization signal/physical broadcast channel signal block.

The SSB beams are generally static or semi-static. The maximum number of SSB beams in each cell ranges from 4 to 64, forming a (beam) grid covering the entire cell. Generally, after the terminal device is turned on, it searches for and measures the beams, and maintains a set of candidate beam sets. The candidate beam set can include beams from multiple cells. The terminal device can measure signals of the beams to determine beam quality. For example, the terminal device can measure the reference signal received power (RSRP) of the beam synchronization signal (SS), that is, SS-RSRP. For another example, the terminal device can measure the reference signal received quality (RSRQ) based on the synchronization signal, that is, SS-RSRQ. For another example, the terminal device can measure the signal-to-noise and interference ratio (SINR) of the beam based on the synchronization signal, that is, SS-SINR.

In some embodiments, the network device (e.g., gNB) can know the appropriate beam based on a layer 3 (L3) measurement report or a position report of the terminal device. The L3 measurement report includes a beam level result. However, in some cases, the network device does not have such information, for example, in the absence of a position report.

As can be seen from the above, in the RACH-less handover, the grant is pre-allocated. If the appropriate beam of the terminal device cannot be determined, if the target cell allocates grants on all beams, it leads to resource waste. If grants are allocated on some beams, the terminal device may miss the configured uplink resource.

For example, in the NTN, in the absence of the position report or the L3 measurement report, the target NTN2 cannot know the beam associated with the terminal device, or the appropriate beam may change before or during the RACH-less handover process, so that the appropriate uplink resources cannot be pre-configured.

For another example, in the case of combining a conditional handover (CHO) with a RACH-less handover, the time point for triggering the handover is uncertain, so appropriate uplink resources cannot be pre-configured.

In summary, when introducing the RACH-less handover in the NTN scenario, how to reserve and pre-configure uplink resources in the RACH-less handover command to improve the access success rate of the handover of the terminal device has become a problem to be solved.

It should be noted that the problem of handover failure caused by large propagation delay and inappropriate reserved resource configuration when introducing the RACH-less handover in the NTN system mentioned above is just an example. The embodiments of the present disclosure can be applied to any type of handover scenario where the propagation delay is relatively large and the terminal device is unable to communicate with the target cell through random access.

Based on this, a method for a NTN satellite handover is provided according to an embodiment of the present disclosure. Through the method, the terminal device can send the selected beam or the measurement information of the beam to the target satellite network before performing cell handover, so that the target satellite network can configure uplink resources on the appropriate beam according to such information, thereby improving the success rate of handover.

Figure 4:
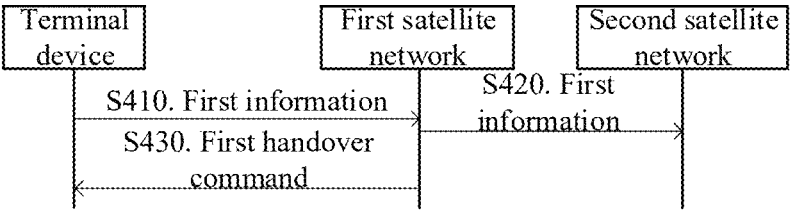
FIG. 4 is a schematic flowchart of A method for non-terrestrial network satellite handover.

In order to facilitate understanding, the method proposed in the embodiments of the present disclosure is described in detail in combination with FIG. 4. FIG. 4 is written from the perspective of the interaction among the terminal device, the first satellite network, and the second satellite network. The method shown in FIG. 4 is applied to the satellite handover from a coverage area of the first satellite network to a coverage area of the second satellite network.

The terminal device is any of the terminal devices described above. In some embodiments, the terminal device is a communication device served by a satellite in the NTN system. In some embodiments, the terminal device is a communication device with a relatively low service transmission rate.

The first satellite network and the second satellite network are NTN networks integrating ground facilities, satellites, and other aerial platforms. As mentioned above, aerial platforms such as satellites in the first satellite network and the second satellite network can serve as network devices to provide services or act as relays. Taking satellites as an example, the network devices corresponding to the first satellite network and the second satellite can be satellites or ground-based base stations. For brevity, the satellite corresponding to the first satellite network can be referred to as a first satellite, and the satellite corresponding to the second satellite network can be referred to as a second satellite. The network device corresponding to the first satellite network can be referred to as a first network device, and the network device corresponding to the second satellite network can be referred to as a second network device.

The first satellite network is the NTN network that provides services to the terminal device at the current moment. The first satellite network can also be referred to as the source NTN or the source satellite network. In some embodiments, the first satellite network provides services to terminal devices in its coverage area via the network device corresponding to the first satellite network.

The network device corresponding to the first satellite network is the communication device that provides services to the terminal device at the current moment. In some embodiments, the network device can be a device that is movable relative to the terminal device. For example, the first network device can be a base station on a satellite that provides services to the terminal device. For another example, the first network device can be a base station mounted on a low-altitude aircraft. In some embodiments, the network device can be a device that is stationary relative to the terminal device or the earth. For example, when the satellite in the first satellite network acts as a relay, the first network device can be a ground-based base station that communicates with the satellite through a gateway.

The coverage area of the first satellite network is an area where the first satellite network provides communication services. In some scenarios, the coverage area of the first satellite network can also be referred to as a source cell. In some embodiments, the coverage area of the first satellite network may include one or more terrestrial network cells.

The second satellite network is an NTN that provides services to the terminal device after the first satellite network. The second satellite network can also be referred to as a target NTN or a target satellite network. In some embodiments, the second satellite network provides services to the terminal devices in its coverage area via the network device corresponding to the second satellite network. In some embodiments, the first satellite network can determine a plurality of satellite networks that can provide services to the terminal device based on a satellite movement trajectory and/or ephemeris information, and determine a second satellite network. In some embodiments, the terminal device can determine the second satellite network from a plurality of candidates by signal measurement.

The network device corresponding to the second satellite network is a next communication device that provides services to the terminal device. In some embodiments, the second network device can be a device that is movable relative to the terminal device, or it can be a device that is relatively stationary to the terminal device or relatively stationary to the earth, which is not described in detail herein.

The coverage area of the second satellite network is an area where the second satellite network provides communication services. In some scenarios, the coverage area of the second satellite network can also be referred to as a target cell. In some embodiments, the coverage area of the second satellite network may include one or more terrestrial network cells.

The satellite handover can be the handover of the satellite corresponding to the area where the terminal device is located. Exemplarily, the satellite handover can be a cell handover. Exemplarily, the physical cell identity (PCI) of the coverage area remains unchanged during the satellite handover.

Referring to FIG. 4, in step S410, sending, by the terminal device, first information to the first satellite network.

The first information is used by the second satellite network to determine a first beam corresponding to the terminal device, so that the second satellite network can pre-configure a first resource for a satellite handover for the terminal device. The first beam is also used by the second satellite network to schedule a second resource related to the satellite handover. That is to say, the first beam is related to the first resource and/or the second resource used by the second satellite network for the satellite handover.

In some embodiments, the first resource can be a configured or pre-configured resource. For example, the first resource is a reserved resource for the terminal device to perform the satellite handover. For another example, the first resource may include an uplink grant for the satellite handover.

In some embodiments, the second resource can be a scheduled uplink resource. The uplink resource can be dynamically scheduled.

Exemplarily, the first resource is a reserved resource for the satellite handover, and the second resource is a scheduled uplink resource, and the uplink resource is used by the terminal device to perform the satellite handover. For example, the first resource is a reserved resource for the terminal device to send an initial uplink transmission, and the second resource is a resource dynamically scheduled through a physical downlink control channel (PDCCH).

The first beam is one of all the beams used by the second satellite network to cover the service area. In some embodiments, the first beam is a single beam. In some embodiments, the first beam is a plurality of beams. Generally, the number of beams of the first beam is less than the number of all the beams of the second satellite network. Therefore, the second satellite network only allocates uplink resources on some of the beams, which can effectively save resources.

The terminal device can determine a plurality of beams of the second satellite network in various ways. In some embodiments, before the handover process, after the first satellite network informs the terminal device of the target satellite network for handover (i.e., the second satellite network), the terminal device can determine a plurality of beams of the second satellite network by measurement. In some embodiments, before the handover process, the first satellite network can provide the terminal device with information indicating a plurality of beams of the second satellite network. The information can identify the plurality of beams, or identify the beam information by identifying reference signals transmitted via the beams. For example, the terminal device can identify the beam information through the SSB. For another example, after receiving the information, the terminal device can identify and measure one or more characteristics of the reference signals to determine the beams. The one or more characteristics are, for example, power, RSRP, RSRQ, etc.

The first beam can be one or more beams through which the terminal device can access the second satellite network, or an appropriate beam for the terminal device to perform subsequent communication with the second satellite network. That is to say, the terminal device can establish communication with the second satellite network through the first beam. When the second satellite network configures or pre-configures the first resource for a satellite handover on the first beam, the terminal device can make better use of the resource for network access, thus improving the success rate of the satellite handover without wasting resource.

The first beam is related to the first source pre-configured by the second satellite network for the satellite handover. Exemplarily, the second satellite network allocate a grant for the satellite handover on the first beam. The second satellite network can perform resource reservation associated with the first beam, and include information related to the resource reservation in the handover request acknowledge sent to the first satellite network.

The first resource can be a time-frequency resource reserved by the second satellite network for the terminal device to perform the satellite handover. For example, the first resource can be used for an initial uplink transmission of the terminal device in the RACH-less handover. Since the terminal device only uses the resource when performing the handover, the first resource is generally pre-configured by the second satellite network. It should be understood that in some scenarios, the second satellite network can also dynamically configure the first resource.

In some embodiments, the first resource may include one or more pre-allocated grants. For example, the terminal device can access through the pre-allocated grants.

The second resource can be a resource scheduled by the second satellite network according to the communication requirements, so that the terminal device can perform the uplink transmission. In some embodiments, the second resource can be an uplink resource dynamically scheduled by the second satellite network. In some embodiments, the second resource can be an uplink resource scheduled in real time by the second satellite network.

Exemplarily, the second satellite network can send a PDCCH on the first beam. For example, in the RACH-less handover, instead of sending a media access control control element (MAC CE) of a contention resolution identifier of the terminal device, the second satellite network sends the PDCCH or a physical downlink shared channel (PDSCH) that can be addressed to a cell-radio network temporary identifier (C-RNTI).

Exemplarily, before completing the RACH-less handover, the MAC entity may not select an uplink grant of a logical channel corresponding to a data radio bearer (DRB). The uplink grant is used for the HARQ process of the initial UL transmission. If the PDCCH scheduling the DL/UL and addressed to the C-RNTI is received after the initial UL transmission, it is considered that the RACH-less handover is completed.

In some embodiments, the first resource may include one or more pre-allocated uplink (UL) grants. The grants can be used by the terminal device to access the network. For example, based on a measurement report, the second satellite network can provide one or more UL-grants to the terminal device. The one or more UL-grants can each be associated with the first beam in the second satellite network.

Exemplarily, the terminal device can use the available UL-grants (RRC, MAC, PHY)) to send the initial uplink transmission. The initial uplink transmission includes messages such as RRC Reconfiguration Complete.

In some embodiments, the first resource can also be associated with a SSB index of the first beam, so that the terminal device can determine the beam where the first resource is located with the SSB index. For example, the first beam is further configured to carry one or more synchronization signal blocks for the terminal device to perform the satellite handover. The index of the one or more synchronization signal blocks is associated with the first resource.

Exemplarily, the first information can also include the index of one or more SSBs measured by the terminal device. The second satellite network can determine the first beam with the SSB index. In a case that a single SSB is mapped to one beam, since the coverage area of the beam is much larger than the coverage area of the TN, and different frequency reuse modes are considered between the beams, the SSB at a specific time point with a detectable position of the UE represents an appropriate beam for subsequent communication. However, in the NTN, there will be a case that one or more SSBs are associated with one beam. If multiple SSBs are mapped to one beam, since the same satellite settings and propagation are shared, the channel quality is nearly similar or completely the same. In this case, the terminal device may not be able to perform SSB selection in the RACH-less handover. In order to solve this problem, when the second satellite network allocates the first beam for the terminal device to perform the RACH-less handover, it can associate the first beam with the SSB index. The terminal device can know the reservation information related to the pre-allocated resource associated with the SSB indexes.

Exemplarily, the second satellite network can specify one or more grants related to the SSB indexes. The grants related to the SSB indexes are configured to indicate the SSBs available for the RACH-less handover and the corresponding resource. If the terminal device accesses the SSBs, it can directly perform synchronization and network access.

The first information can include various types of content for the second satellite network to determine the first beam. In some embodiments, the first information can directly indicate the first beam selected by the terminal device. That is to say, the terminal device can determine the appropriate first beam by itself and then inform the second satellite network through the first satellite network. For example, the terminal device can measure multiple beams of the second satellite network, and directly inform the second satellite network of the information through the first information after determining the first beam according to the measurement results. In some embodiments, the first information can include multiple first measurement results measured by the terminal device on multiple beams of the second satellite network. The multiple first measurement results are used by the second satellite network to determine the first beam. That is to say, the first information can also be a measurement report. For example, the terminal device can measure the respective intensities of reference signals, generate respective measurement reports, and provide the measurement reports to the second satellite network.

In some embodiments, when the terminal device performs beam selection, the beam selection can be periodic, aperiodic, or triggered. During the satellite handover, through the association between the pre-allocated grants and the beams or the SSBs, the second satellite network can know the beam selected by the terminal device and use the corresponding beam to schedule subsequent transmissions.

The first measurement result can be a result of the terminal device measuring the reference signal of the beam. In some embodiments, the reference signal can be a synchronization signal block reference signal (SSB-RS), or a reference signal (RS) of a channel state information (CSI), that is, a CSI-RS, or both the CSI-RS and the SSB-RS.

The first measurement result can be used to represent the signal quality of the reference signal of the beam. The signal quality can also be referred to as signal strength. In order to indicate the signal quality, the first measurement result can be the RSRP, RSRQ or SINR mentioned above, or it can be a reference signal strength indication (RSSI), or it a plurality of the above.

In some embodiments, the terminal device or the second satellite network can determine the first beam based on the multiple first measurement results and/or a first threshold. The first threshold can be set by the terminal device or by the second satellite network. In some embodiments, the terminal device and the second satellite network can share the parameter through the first satellite network, so that the first beams determined by the terminal device and the second satellite network are the same or similar.

Exemplarily, the first measurement result corresponding to the first beam can be a maximum value among the multiple first measurement results. In the scenario, the first beam can include a single beam. For example, the second satellite network can generate an UL-grant associated with the reference signal of the highest intensity.

Exemplarily, the first measurement result corresponding to the first beam can be a specified number of several larger measurement results among the multiple first measurement results. That is to say, the number of the first beams can be specified. For example, the first measurement result corresponding to the first beam can be largest M values among multiple first measurement results, with M greater than 1. In the scenario, the first beam can include multiple beams. For example, the second satellite network can generate UL-grants for a specified number of beams with the best quality level (e.g., based on intensity) among the measured reference signals.

Exemplarily, the first measurement result corresponding to the first beam can be multiple measurement results greater than the first threshold. That is to say, the signal quality corresponding to the first beam can be specified. In the scenario, the first beam can include at least one beam. For another example, the second satellite network can generate UL-grants for reference signals at least greater than a RSRP threshold level. In order to ensure that the first beam determined by the terminal device is consistent with the first beam of the second satellite network, the second satellite network can send second information indicating the first beam to the terminal device via the first satellite network. If the second information indicates a single beam or multiple beams, the terminal device monitors a PDCCH of the second satellite network based on the indicated single or multiple beams, thereby improving the access success rate. Otherwise, the terminal device monitors the PDCCH based on the beam it has selected. For example, the terminal device directly suggests the selected first beam in the first information, and the second satellite network sends the PDCCH according to the first beam.

In some embodiments, the terminal device receives the second information in the received first handover command.

In some embodiments, the terminal device receives the second information after sending the first information. The second information is configured to indicate the first beam. After receiving the first handover command, the terminal device detects a downlink channel sent by the second satellite network according to the first beam indicated by the second information.

Exemplarily, the first beam is indicated by an identifier of the reference signal associated with the first beam. For example, the second satellite network can specify the reference signal associated with the UL-grant by associating the identifier (e.g., index) of the reference signal with the UL-grant. Optionally, the second satellite network can include the identifier in the message (e.g., an RRC message) that provides the UL-grant to the terminal device.

Before the terminal device performs the satellite handover, the first information can be sent to the first satellite network at different times. In some embodiments, the first information can be sent to the first satellite network after the first satellite network makes a handover decision. Exemplarily, after the first satellite network determines the second satellite network through the handover decision, the terminal device can measure a plurality of beams of the second satellite network to generate the first information. Exemplarily, after the first satellite network determines the second satellite network through its decision, it can send the information of the plurality of beams in the second satellite network to the terminal device. After receiving the information, the terminal device performs beam measurement or beam selection, to generate the first information to be sent. In some embodiments, the first information can be included in the first measurement report sent by the terminal device. For example, in a case that the second satellite network does not require the decision of the first satellite network, or in a case that the beam information of the second satellite network does not need to be informed to the terminal device by the first satellite network, the terminal device can include the first information in the first measurement report for handover.

In step S420, sending, by the first satellite network, the first information to the second satellite network. Since the terminal device has not accessed the second satellite network yet, the first information needs to be forwarded by the first satellite network to the second satellite network. Further, the second information sent by the second satellite network to indicate the first beam also needs to be forwarded by the first satellite network to the terminal device.

In some embodiments, the first information is included in the handover request sent by the first satellite network to the second satellite network, which can reduce the interaction between the two satellite networks and save air-interface resources.

In some embodiments, the second information is included in the handover request acknowledge sent by the second satellite network to the first satellite network, which similarly can reduce the interaction between the two satellite networks and save air-interface resources.

Referring to FIG. 4, in step 430, receiving a first handover command.

The first handover command received by the terminal device comes from the first satellite network. That is to say, the first satellite network currently providing services to the terminal device instructs the terminal device to perform a handover. In some embodiments, the first network device corresponding to the first satellite network sends the first handover command to the terminal device.

The first handover command is configured to trigger the terminal device to perform a handover. In some embodiments, the first satellite network can trigger the handover by sending RRC signaling to the terminal device. For example, the first satellite network can trigger the RACH-less handover by sending an RRC Reconfiguration message to the terminal device. In some embodiments, the first satellite network can trigger the handover through separately configured information. For example, the message related to the RACH-less handover command can be sent through the added dedicated signaling.

The first handover command is configured to instruct the terminal device to perform a satellite handover from a coverage area of the first satellite network to a coverage area of the second satellite network. In some embodiments, due to the movement of the satellite, the area where the terminal device is located changes from the coverage area of the first satellite network to the coverage area of the second satellite network, and a handover is required. In some embodiments, due to the movement or edge communication of the terminal device, the area where the terminal device is located changes from the coverage area of the first satellite network to the coverage area of the second satellite network, and a handover is required.

The first handover command can be a satellite handover command in various forms. In some embodiments, the first handover command can be a command that the terminal device cannot perform the satellite handover through the RACH. For example, the first handover command is a RACH-less handover command. For another example, the first handover command does not provide a resource for the terminal device to perform random access. The embodiments of the present disclosure will be specifically described below by taking the RACH-less handover as an example.

In some embodiments, the first satellite network can determine whether to send a RACH-less handover command to the terminal device according to the actual situation. For example, when the service network of the terminal device needs to be handed over from the first satellite network to the second satellite network due to the movement of the satellite or other reasons, the RACH-less handover can be preferred to reduce the handover delay.

When the satellite handover is the RACH-less handover, the first satellite network needs to determine the second satellite network meeting a RACH-less handover condition before sending the first handover command. As can be seen from the previous description, multiple satellite networks capable of providing services to the terminal device are provided, and the satellite networks are referred to as candidate satellite networks. If no second satellite network among the multiple candidate satellite networks can meet the RACH-less handover condition, the terminal device can perform a satellite handover by following the conventional handover process. That is to say, if the first satellite network does not find a second satellite network meeting the condition, the first handover command is a command for the conventional handover mode.

In some embodiments, the first satellite network can determine the second satellite network according to the measurement report of the terminal device. For example, the first satellite network can determine the second satellite network meeting certain condition according to the measurement results in the measurement report. In some embodiments, the first satellite network can determine the second satellite network by itself. For example, after the first satellite network determines the multiple satellite networks capable of providing services to the terminal device, it can determine the second satellite network according to position information or movement information of the terminal device.

In some embodiments, when the satellite handover is the RACH-less handover, the terminal device can send a first measurement report to the first satellite network. The first measurement report can include multiple second measurement results of the terminal device measuring the reference signals of the multiple candidate satellite networks, so as to determine the second satellite network meeting the RACH-less handover condition among the multiple candidate satellite networks.

As described above, the reference signals of the multiple candidate satellite networks can also be the SSB-RS and/or CSI-RS. The signal quality of the reference signals can be at least one of the RSRP, RSRQ, SINR, and RSSI.

Exemplarily, the terminal device can measure the signal power and/or the signal quality of the reference signal in the coverage area of each candidate satellite network. When multiple candidate satellite networks are provided, multiple second measurement results can be obtained. The second measurement results can be configured to generate a first measurement report. That is to say, if multiple target NTNs are provided, such as NTN2, NTN3 . . . , the terminal device reports the measurement results of the reference signals based on the multiple target NTNs.

Exemplarily, the multiple second measurement results in the first measurement report can determine whether there is a second satellite network meeting the RACH-less handover condition. For example, the second satellite network is determined according to whether any one of the multiple CSI-RS measurement results meets the RACH-less handover condition. For another example, whether the SSB-RS measurement result of any one of one or more candidate satellite networks meets the RACH-less handover condition is determined.

In some embodiments, the satellite handover can be a satellite handover without changing the PCI (without requiring Layer 3 mobility). In the scenario where the PCI remains unchanged, the terminal device can hand over to a target satellite with the same cell configuration except for the satellite specific information. Exemplarily, except for the TA acquisition and the DL/UL synchronization in the scenario where the PCI remains unchanged, the terminal device can keep the specific configuration of the terminal device unchanged. That is to say, the terminal device does not need to perform reconfiguration. Therefore, the scenario where the PCI remains unchanged is a specific case of inter-satellite handover with the same gateway/gNB.

Optionally, if the first satellite network receives the RACH-less handover information of the candidate satellite network with the same PCI, the candidate satellite network can be regarded as the preferred target satellite network.

In specific handover modes such as RACH-less handover, the quality of the reference signal of the second satellite network is extremely important. For example, in the RACH-less handover, in order to ensure reliable initial UL transmission, the signal quality of the downlink of the second satellite network needs to be greater than or equal to a threshold. For another example, the RACH-less handover can only be triggered when the downlink RSRP measured by the terminal device is greater than or equal to a RSRP threshold.

Exemplarily, a second measurement result corresponding to the second satellite network is a maximum value among multiple second measurement results. For example, the first satellite network can select the satellite network with the maximum RSRP among the multiple candidate satellite networks as the second satellite network.

Exemplarily, a second measurement result corresponding to the second satellite network is one of the second measurement results greater than or equal to a second threshold among the multiple second measurement results. The second threshold can be set by the first satellite network. In some embodiments, the second threshold can be different for different signal quality parameters. In some embodiments, the second threshold can be determined according to parameters such as the actual communication environment and the service type.

For example, when the first measurement report includes the RSRP of the SSB-RS of the multiple candidate satellite networks, if the RSRP of a candidate satellite network is greater than or equal to the second threshold corresponding to the RSRP, the candidate satellite network is the second satellite network. The first satellite network takes the RACH-less handover as the optimal handover mode based on the measurement report of the terminal device and hands over to the candidate satellite network.

For another example, the terminal device reports the first measurement report to the first satellite network. After receiving the first measurement report, the first satellite network decides whether to trigger the RACH-less handover of the terminal device. The RACH-less handover of the terminal device can only be triggered when the downlink RSRP measured by the terminal device is greater than or equal to the RSRP threshold.

In some embodiments, the first satellite network sends a handover request to the second satellite network before sending the handover command, and sends the first handover command after receiving the request acknowledge from the second satellite network. Exemplarily, after determining that there is a satellite network meeting the condition and triggering the RACH-less handover, the first satellite network sends a RACH-less handover request to the second satellite network. The second satellite network can send a handover request acknowledge (ACK) message to the first satellite network. Based on this, the first satellite network can send the first handover command to the terminal device.

Exemplarily, the handover request acknowledge can also be referred to as a handover request response, response information, etc. The handover request acknowledge can be expressed as HANDOVER REQUEST ACKNOWLEDGE.

The handover request acknowledge sent by the second satellite network can include various types of information, so that the first satellite network can inform the terminal device through the first handover command. For example, the handover request acknowledge includes the UL-grant determined by the second satellite network. For another example, the handover request acknowledge includes the SSB index and the pre-allocated grant in the second satellite network related to the transmission of the terminal device.

In some embodiments, the handover request acknowledge includes information related to resource reservation, or factor information related to power when the terminal device hands over and accesses the second satellite network, etc. The information related to power is described in conjunction with FIG. 7.

Exemplarily, the handover request acknowledge includes the above second information to reduce the interaction among the terminal device, the first satellite network, and the second satellite network. That is to say, the second satellite network can indicate the first beam or the SSB index associated with the first resource through the handover request acknowledge.

The first satellite network can generate the first handover command according to the handover request acknowledge from the second satellite network. The first handover command includes various types of information.

In some embodiments, the first handover command includes one or more of the following information: a grant pre-allocated by the second satellite network; the first source pre-configured by the second satellite network; a beam index associated with a synchronization signal block in the second satellite network; a maximum signal quality reported in the coverage area received by the second satellite network and a beam index associated with the maximum signal quality; a beam index associated with a specified signal quality reported in the coverage area received by the second satellite network; an average value of admission power of terminal devices other than the terminal device in the second satellite network; and a maximum value of admission power of terminal devices other than the terminal device in the second satellite network.

Exemplarily, the pre-allocated grant and the pre-configured first resource of the second satellite network are used by the terminal device to perform the handover.

Exemplarily, the beam index associated with the synchronization signal block in the second satellite network refers to the beam index corresponding to the SSB associated with the pre-allocated grant or the first resource in the second satellite network.

Exemplarily, the maximum signal quality reported in the coverage area and the beam index associated with the maximum signal quality can be the beam index corresponding to the signal with the maximum signal quality received in the second satellite network, so as to facilitate the terminal device to determine the access beam.

Optionally, the terminal device can select, in the coverage area of the second satellite network, the maximum signal quality and the beam associated with the maximum signal quality among the signal qualities reported by other terminal devices received by the second satellite network as the access beam for its own access in the second satellite network.

Exemplarily, the beam index associated with the specified signal quality reported in the coverage area can be the beam index of the signal corresponding to the specified signal quality parameter, which can be used for the terminal device to determine the optimal access beam.

Optionally, the specified signal quality is determined according to the average signal quality and a specific reference quantity. For example, the specified signal quality can be a signal quality obtained by adding or subtracting a specific reference quantity from the average signal quality.

Optionally, the specified signal quality is determined according to the maximum signal quality and a specific reference quantity. For example, the specified signal quality can be a signal quality obtained by subtracting a specific reference quantity from the maximum signal quality.

Optionally, the beam associated with the signal quality obtained by adding or subtracting a specific reference quantity from the reported average signal quality is taken as the access beam of the terminal device in the second satellite network.

Optionally, the signal quality can also be referred to as the signal strength. The signal quality can be represented by at least one of the parameters such as the RSRP, RSRQ, RSSI described above, or other parameters indicating the signal quality.

Exemplarily, the average value and the maximum value of the admission power of the terminal devices other than the terminal device in the second satellite network can be used by the terminal device to determine transmission power. The following will be described in detail in combination with FIG. 7 later.

For example, when the first handover command is a RACH-less handover command, the command may include one or more of the following information: a pre-allocated grant, an access beam index and resource reservation associated with the SSB; providing an azimuth angle of the second satellite network relative to the terminal device based on the position information of the terminal device; a maximum signal strength in the coverage area received by the second satellite network, such as RSRP, RSSI, etc.; an average signal strength in the coverage area received by the second satellite network, such as RSRP, RSSI, etc.; an average value of admission received power of other terminal devices admitted by the second satellite network; a maximum value of admission received power of other terminal devices admitted by the second satellite network; and time-related parameters of the second satellite network.

As can be seen from FIG. 4, in some handovers (for example, the RACH-less handover), after determining the second satellite network for handover, the terminal device can send information for determining the first beam to the second satellite network, so that the second satellite network can perform more effective resource reservation, thereby improving the success rate of the handover. When the resource reservation is indicated by an UL-grant, the UL-grant can be allocated through RRC signaling and/or the PDCCH of the second satellite network, so as to facilitate the reception by the terminal device.

Figure 5:
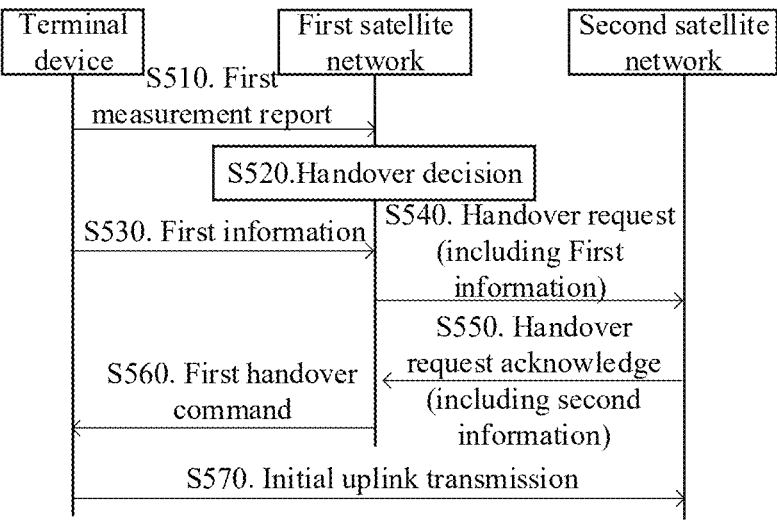
FIG. 5 is a schematic flowchart of a possible implementation of the method shown in FIG. 4.
Figure 6:
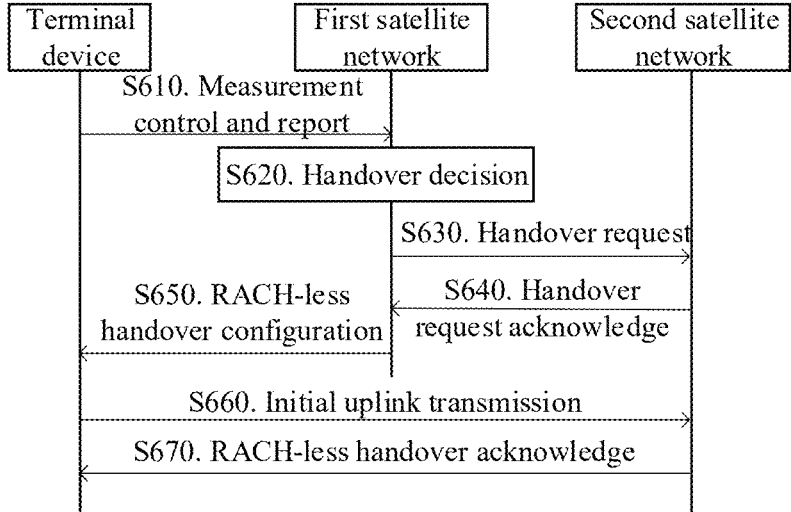
FIG. 6 is a schematic flowchart of another possible implementation of the method shown in FIG. 4.

In order to facilitate understanding, two possible implementation manners shown in FIG. 5 and FIG. 6. FIG. 5 are described exemplarily below. FIG. 5 is a schematic flowchart of the terminal device sending the first information to the second satellite network before receiving the first handover command. FIG. 6 is a schematic flowchart of the terminal device performing the RACH-less handover.

Referring to FIG. 5, in step S510, sending, by the terminal device, a first measurement report to the first satellite network.

In step S520, making, by the first satellite network, a handover decision, to determine the second satellite network.

In step S530, sending, by the terminal device, first information to the first satellite network. The terminal device can identify and measure according to beam identification information of the second satellite network sent by the first satellite network, to generate and send the first information.

In step S540, sending, by the first satellite network a handover request to the second satellite network. The handover request includes the first information for the second satellite network to determine the first beam.

In step S550, sending, by the second satellite network, a handover request acknowledge to the first satellite network. The handover request acknowledge includes the second information for indicating the first beam to the terminal device.

In step S560, sending, by the first satellite network, a first handover command to the terminal device.

In step S570, sending, by the terminal device, an initial uplink transmission to the second satellite network.

In FIG. 5, sending, by the terminal device, the first information is after the handover decision. Exemplarily, before the terminal device sends the first information for the second satellite network to determine the first beam, the first satellite network can send the decision result of step S504 to the terminal device, so that the terminal device can determine the second satellite network.

Referring to FIG. 6, in step S610, sending, by the terminal device, a measurement control and report to the first satellite network.

In step S620, making, by the first satellite network, a handover decision (HO decision).

In step S630, sending, by the first satellite network, a handover request (HO request) to the second satellite network.

In step S640, sending, by the second satellite network, a handover request acknowledge (HO request ACK) to the first satellite network.

In step S650, sending, by the first satellite network, a RACH-less handover configuration information (RACH-less HO configuration) to the terminal device. The terminal device starts timers T304 and T430 in sequence.

In step S660, sending, by the terminal device, an initial uplink transmission. The initial uplink transmission is sent through available uplink grants (RRC, MAC, PHY). The initial uplink transmission includes the sending of the RRC Reconfiguration Complete message.

In step S670, receiving, by the terminal device, a RACH-less handover acknowledge (RACH-less HO ACK) from the second satellite network, to complete the RACH-less handover. The second satellite network releases the pre-allocated UL-grant, and the terminal device stops the timer T304.

The handover request acknowledge in FIG. 6 includes the above second information, so that the terminal device can determine the first beam or the SSB associated with the reserved resource of the second satellite network.

In some mobility scenarios, the terminal device can receive a list of candidate satellite networks (which can be simply referred to as candidate networks) and a handover command with a handover condition, and autonomously perform a handover (or a handover attempt) to the target satellite network. The target satellite network is one of the candidate networks meeting the handover condition. The type of handover can be referred to as "conditional handover (CHO)", and the handover command related to the conditional handover can be referred to as a "conditional handover command". For the conditional handover, the terminal device can autonomously select the target network from the candidate networks based on the measurements of the candidate networks.

In NTN, if the CHO is configured, the condition for the terminal device to perform the satellite handover can be referred to as a first condition. That is to say, the satellite handover is performed under meeting the first condition.

If the RACH-less handover and the CHO are configured, the first handover command needs to indicate multiple candidate satellite networks and multiple uplink grants. For example, the first handover command includes parameters of the multiple candidate satellite networks, and the first resource in the first handover command includes the multiple uplink grants. The terminal device can, under meeting the first condition, determine the second satellite network among the multiple candidate satellite networks and determine the uplink grant for the terminal device to perform the handover among the multiple uplink grants.

Exemplarily, in the satellite handover with the configuration of the RACH-less handover and the CHO, the first satellite network and the second satellite network need to indicate the timing adjustment and the multiple optional pre-allocated grants.

Exemplarily, the first satellite network can further receive third information sent by the terminal device. The third information is configured to indicate the first condition. The third information includes one or more of the following information: a handover condition associated with at least one candidate satellite network based on the SSB-RS; a handover condition associated with at least one candidate satellite network based on the CSI-RS; a measurement result/measurement information of at least one SSB-RS or at least one CSI-RS; and at least one SSB-RS or at least one CSI-RS associated with a contention-less random access resource.

For example, the first satellite network can receive the RRC reconfiguration information from the terminal device. The RRC reconfiguration information include signal measurement results of at least one target satellite network, at least one SSB-RS, at least one CSI-RS associated with the CHO execution, a CHO execution condition based on the SSB, and a CHO execution condition based on the CSI-RS.

The handover conditions for introducing the RACH-less handover and the CHO in the NTN are described, so that the terminal device can autonomously perform the satellite handover under meeting the conditions.

The method embodiment for solving the problem of resource reservation is described in combination with FIG.

4. In the RACH-less handover process, due to the absence of transmission of RACH preamble and reception of random access response, the terminal device may set the initial transmission power at an inappropriate level due to the misestimated path loss. Exemplarily, when the terminal device receives the information about the UL-grant, the terminal device may fall into a logical deadlock, resulting in the failure of the handover. For example, the terminal device determines the UL-grant, but the network device cannot receive the uplink transmission due to the low transmission power, resulting in the failure of the response message.

In the RACH-less handover, if the terminal device directly refers to power control rules of a physical uplink shared channel (PUSCH) of the configured grant for the initial transmission power of the uplink transmission, there may be problems such as uncertain path loss and inapplicable power adjustment.

Exemplarily, the grant in the RACH-less handover is pre-allocated or dynamically granted, and the determination of path loss is unclear or inaccurate. In the NTN system, the satellite is at a great height from the ground and the coverage area of the satellite is large, so inaccurate path loss estimation has a significant influence on power. In some scenarios, if the two satellites for the handover are of different types and have a large difference in height from the ground, which also affects the accuracy of path loss estimation.

Exemplarily, for the power adjustment and power control adjustment of PUSCH, since the current specifications have conditions such as "if the UE receives a random access response message in response to PRACH transmission", the power adjustment and power control adjustment based on PRACH transmission power are not applicable to RACH-less handover.

Exemplarily, for the power adjustment and the power control adjustment of the PUSCH, since the current specifications has a condition such as "if the UE receives a random access response message in response to the PRACH transmission", the power adjustment and the power control adjustment based on the PRACH transmission power are not applicable to the RACH-less handover.

In summary, when the RACH-less handover is introduced in the NTN, how the terminal device determines the initial transmission power for the uplink transmission in the pre-allocated resources to improve the access success rate of the handover of the terminal device has become a problem to be solved.

It should be noted that the problem that when the RACH-less handover is introduced in the NTN system, the inappropriate transmission power is caused by the uncertain path loss and the inability to trigger the power control adjustment through the PRACH, is just an example. The embodiments of the present disclosure can be applied to any type of handover scenario where there is uncertain path loss in the transmission power or the power adjustment cannot be triggered.

In order to solve the above problems, the embodiments of the present disclosure propose another method for NTN satellite handover. By the method, the first handover command includes power-related information in the coverage area of the second satellite network and/or relative position information between the network device corresponding to the second satellite network and the terminal device, so that the terminal device can determine first power for the uplink transmission to the second satellite network. Thus, it can be seen that the first power takes into account the communication or the position situation of the second satellite network, which is beneficial to improving the accuracy of the first power, thereby improving the success rate of the handover.

In order to facilitate understanding, another method proposed in the embodiments of the present disclosure is described in detail in combination with FIG. 7. The method shown in FIG. 7 is executed by the terminal device. The method shown in FIG. 7 is also used for the satellite handover from the coverage area of the first satellite network to the coverage area of the second satellite network. For the sake of brevity, the term explanations given in FIG. 4 will not be repeated in FIG. 7.

Referring to FIG. 7, in step S710, receiving a first handover command.

The first handover command received by the terminal device comes from the first satellite network. The first satellite network can determine the first handover command according to the handover request acknowledge sent by the second satellite network.

The first handover command is configured to determine the first power for the terminal device to perform the uplink transmission to the second satellite network. In some embodiments, the first handover command can be a RACH-less handover command. In some embodiments, the first handover command can be a handover command of other handover methods without a random access response.

The uplink transmission performed by the terminal device to the second satellite network can be the above initial uplink transmission, or other uplink transmission sent by the terminal device to the second satellite network. Exemplarily, the uplink transmission is a PUSCH transmission.

The uplink transmission can be performed on the first resource pre-configured by the second satellite network. In some embodiments, for the PUSCH transmission with the reserved resource in the RACH-less handover, the SSB can be associated with the initial PUSCH transmission. That is to say, for the pre-allocated initial PUSCH transmission, the SSB can be determined before determining the PUSCH resources.

The first power can be transmission power for the terminal device to send the initial uplink transmission, or initial transmission power for the terminal device to communicate with the second satellite network. As can be seen from the above, in the NTN, if the terminal device performs the handover without performing the random access process and determines the first power without random access response as a reference, problems such as inaccurate path loss estimation or unreasonable power adjustment may occur. Therefore, the first handover command can include relevant information for the terminal device to determine the initial transmission power, so as to improve the accuracy of path loss estimation and/or the rationality of power adjustment.

In order to improve the accuracy of the first power, the first handover command includes the power-related information in the coverage area of the second satellite network, and/or, the relative position information between the second satellite corresponding to the second satellite network and the terminal device. The information related to the communication parameters in the coverage area of the second satellite network can be carried in the handover request acknowledge sent by the second satellite network.

The power-related information in the coverage area of the second satellite network represents power parameters for the second satellite network to communicate with the terminal device within the area. When the terminal device determines the first power according to the power parameters, it can obtain a power value that is more suitable for accessing the second satellite network, thereby improving the access success rate.

In some embodiments, the power-related information in the coverage area of the second satellite network includes one or more of the following parameters: an average value of signal quality of a portion or all of the accessed uplink beams in the area; a maximum value of signal quality of a portion or all of the accessed uplink beams in the area; transmission power of sending a random access uplink channel by at least a portion of accessed terminal devices in the area; an average value of admission power of terminal devices other than the terminal device in the second satellite network; a maximum value of admission power of terminal devices other than the terminal device in the second satellite network; an average path loss in the coverage area of the second satellite network; and a maximum path loss in the coverage area of the second satellite network.

Exemplarily, the power-related information includes the signal quality of the beams related to the RACH-less handover.

Exemplarily, the signal quality is one or more of the RSRP, RSRQ, and RSSI mentioned above.

The portion or all of the accessed uplink beams in the coverage area of the second satellite network refer to the portion or all of the uplink beams in the coverage area received by the second satellite network. In some embodiments, the portion of uplink beams may be the uplink beams of other terminal devices close to the terminal device in position.

Exemplarily, when the handover request acknowledge includes the average value of the signal strength (e.g., RSRP) of the portion or all of the uplink beams in the coverage area received by the second satellite network, the terminal device can obtain the average value through the first handover command. The terminal device can estimate the magnitude of the transmission power required to reach the signal strength at its current position according to the average value as the magnitude of the first power for the terminal device to hand over to the second satellite network.

Exemplarily, when the handover request acknowledge includes the maximum value of the signal strength (e.g., RSRP) of the portion or all of the uplink beams in the coverage area received by the second satellite network, the terminal device can obtain the maximum value through the first handover command. The terminal device can estimate the magnitude of the transmission power required to reach the signal strength at its current position according to the maximum value as the magnitude of the first power for the terminal device to hand over to the second satellite network. When the terminal device determines the first power according to the maximum value, it can effectively solve the problem that the transmission power is too small to receive a response.

The beams related to the RACH-less handover in the coverage area of the second satellite network refer to the beams associated with the reserved RACH-less handover in the coverage area received by the second satellite network. In some embodiments, the associated beams can be SSB beams. For example, the path loss reference signal for the PUSCH transmission can be selected as the reference signal of the SSB for determining the reserved PUSCH resource.

Exemplarily, when the handover request acknowledge includes the signal strength (e.g., RSRP) of the beams associated with the reserved RACH-less handover in the coverage area received by the second satellite network, the terminal device can obtain the value through the first handover command. The terminal device can estimate the magnitude of the transmission power required to reach the signal strength at its current position according to the value as the magnitude of the first power for the terminal device to hand over to the second satellite network.

Exemplarily, for the initial PUSCH transmission based on dynamic grant (DG), the second satellite network can directly indicate the SSB through the PDCCH. Due to the absence of the random access process, for the power control of the initial PUSCH transmission, the path loss reference can be the SSB associated with the initial PUSCH transmission.

The transmission power of sending the random access uplink channel by at least the portion of the accessed terminal devices in the coverage area of the second satellite network refers to the power of the physical random access channel (PRACH) received by the second satellite network in the coverage area. In some embodiments, the parameters can be determined based on initial nominal power of the PUSCH. The initial nominal power for the PUSCH transmission can be configured in the RRC in the same way as in the conventional approach. In some embodiments, if the initial nominal power for the PUSCH transmission is not configured, the parameters can be determined as initial target received power of the PRACH in the second satellite network. Although the PRACH is not initiated by the terminal device performing the RACH-less handover, it can be read from a system information block (SIB) of the second satellite network.

Exemplarily, the terminal device can read the initial target received power of the PRACH of other terminal devices in the SIB1 of the second satellite network as a reference for determining the first power.

Exemplarily, in the RACH-less handover, due to the absence of the random access process, the transmission power of the random access uplink channel can be transmission power of at least a portion of terminal devices sending message A (msgA), or transmission power of at least a portion of terminal devices sending message 3 (msg3). That is to say, the first power is determined based on the transmission power of sending the msgA and/or the msg3 by other terminal devices as a reference. For example, the reference can be an average value or a maximum value of the transmission power of sending the msgA by the portion of terminal devices. For another example, the reference can be an average value or a maximum value of sending the transmission power of the msgA by all of the terminal devices.

The average value or the maximum value of the admission power of terminal devices other than the terminal device in the second satellite network refers to the average value or the maximum value of the admission power that the second satellite network allows other terminal devices to access. For the terminal device, the relevant parameters of the admission power can be used as a reference for the first power. For example, when the service of the terminal device requires timely access to the second satellite network, the first power can be equal to or close to the maximum value of the access power. For another example, the first power can be equal to the average value for the initial uplink transmission.

Exemplarily, the terminal devices other than the terminal device can be a portion of terminal devices in the second satellite network, or all of the terminal devices, which is not limited herein.

Exemplarily, the portion of terminal devices can be other terminal devices with geographical position close to the terminal device.

The average path loss or the maximum path loss in the coverage area of the second satellite network refers to an average value or a maximum value of the path loss in the communication between the network device corresponding to the second satellite network and other terminal devices, which can be used to determine the path loss in the first power.

In some embodiments, the determination of the first power also needs to take into account maximum output power of the terminal device. The first power can be less than or equal to a specific percentage (e.g., 80%) of the maximum output power. Exemplarily, the first power is determined according to the power-related information in the first handover command and the maximum output power of the terminal device. For example, if the maximum output power is less than the maximum value of the admission power, the first power can be determined with reference to the average value.

In step S720, determine the first power for the uplink transmission to the second satellite network according to the first handover command. The various possible implementation methods for determining the first power are described in combination with the information in the first handover command, which is not described herein. The calculation method of the PUSCH transmission power is briefly described below.

The first handover command can further include the relative position information between the second satellite corresponding to the second satellite network and the terminal device, so as to determine a path loss compensation factor of the terminal device in the second satellite network. The second satellite is a satellite corresponding to the second satellite network, and the first satellite is a satellite corresponding to the first satellite network.

The path losses of the terminal device in the first satellite network and the second satellite network are different. The path loss is related to both distance and frequency. The path loss compensation factor of the terminal device in the second satellite network can be used to compensate the path loss of the second satellite network. For the sake of brevity, the path loss compensation factor of the terminal device in the first satellite network can be referred to as a first path loss compensation factor, and the path loss compensation factor in the second satellite network can be referred to as a second path loss compensation factor.

In some embodiments, the second path loss compensation factor can be carried in the first handover command sent by the first satellite network to the terminal device. That is to say, after determining the second path loss compensation factor, the second satellite network can directly send the second path loss compensation factor to the terminal device through the first handover command.

In some embodiments, the relative position information includes a distance between the terminal device and the second satellite. Based on the distance parameter, the path loss can be estimated. The distance can be determined by position coordinate information of the terminal device and position coordinate information of the second satellite. Exemplarily, the position coordinate information of the terminal device can be obtained through GNSS position information or other means. The first satellite network can send the position information of the terminal device to the second satellite network through a handover request message. The position information of the second satellite can be determined through satellite ephemeris information (ephemeris Info).

In some embodiments, the relative position information includes a direction angle between the terminal device and the second satellite. The direction angle can also be referred to as an azimuth angle. The direction angle can be an angle between a line connecting the terminal device and the satellite and a perpendicular line from the satellite to the ground, that is, the direction angle between the terminal device and the point on the ground directly below the satellite. The direction angle can also be determined according to the position of the terminal device and the position of the second satellite.

In some embodiments, the relationship between the path losses of the terminal device to the first satellite network and the second satellite network can be used to determine the second path loss compensation factor.

Exemplarily, the path loss compensation factor of the terminal device in the second satellite network can be determined by the direction angle of the terminal device in the first satellite network and the direction angle of the terminal device in the second satellite network. When the second path loss compensation factor is denoted as K, K can be determined according to the following formula:

$$K = \frac{\cos\delta_1}{\cos\delta_2}.$$

$\delta 1$ represents the direction angle between the terminal device and the first satellite corresponding to the first satellite network, and $\delta 2$ represents the direction angle between the terminal device and the second satellite corresponding to the second satellite network.

In order to facilitate understanding, a schematic description of the determination method of the second path loss compensation factor is described in combination with FIG. 8. Referring to FIG. 8, the satellite 810 is the first satellite corresponding to the first satellite network, and the satellite 820 is the second satellite corresponding to the second satellite network. The terminal device 830 performs the satellite handover from the coverage area of the first satellite network to the coverage area of the second satellite network.

As shown in FIG. 8, the distance between the terminal device 830 and the satellite 810 is D1, and the direction angle is $\delta 1$. The distance between the terminal device 830 and the satellite 820 is D2, and the direction angle is $\delta 2$. The first satellite network and the second satellite network can obtain the direction angle $\delta 1$ and the direction angle $\delta 2$ between the terminal device 830 and the points on the ground directly below the satellite 810 and the satellite 820 at this time by the position coordinate information of the terminal device 830.

Various methods for determining the second path loss compensation factor K are described above. According to the value of K, the first power of the terminal device can be determined. Exemplarily, the first power $P_{PUSCH,b,f,c}$ for the terminal device to perform the uplink transmission on an uplink bandwidth b of a carrier wave f in a serving cell c can be determined according to the following formula:

$$P_{PUSCH,b,f,c}(i, j, q_d, l) =$$

$$\min \left\{ \begin{array}{l} P_{CMAX,f,c}(i) \\ P_{0_{PUSCH,b,f,c}}(j) + 10\log_{10}\left(2^\mu * M_{RB,b,f,c}^{PUSCH}(i)\right) + \\ K * \alpha_{b,f,c}(j) * PL_{b,f,c}(q_d) + \Delta_{TF,b,c,f}(i) + f_{b,f,c}(i, l) \end{array} \right.$$

i represents transmission opportunity, j represents an index of a parameter set configuration, $q_D$ represents an index of the reference signal, l represents an index of the power control adjustment state, $\mu$ is related to the subcarrier wave spacing, $P_{CMAX,f,c}(i)$ represents the maximum output power of the terminal device in the second satellite network, $P_{0_{PUSCH,b,f,c}}(j)$ represents the current transmission power of the terminal device in the first satellite network, $$M_{RB,b,f,c}^{PUSCH}(i)$$

represents the uplink resource bandwidth, $\alpha_{p,f,c}(j)$ represents the path loss compensation factor of the terminal device in the first satellite network, $PL_{b,f,c}(q_d)$ represents the downlink path loss, $\Delta_{TF,b,c,f}(i)$ represents the power adjustment amount, and $f_{b,f,c}(i, l)$ represents the power control adjustment state.

Optionally, $$M_{RB,b,f,c}^{PUSCH}(i)$$

is the number of resource blocks.

Optionally, $\mu$ is a subcarrier wave spacing configuration supported by the protocol. The configuration can realize the adjustment of bandwidth resources under different subcarrier wave spacing configurations, thus realizing the corresponding power adjustment.

As described above, $\alpha_{b,f,c}(j)$ is the first path loss compensation factor estimated for the current terminal device in the first satellite network.

Optionally, $PL_{b,f,c}(q_d)$ is the downlink path loss obtained by the terminal device by measuring the downlink reference signal. The parameter can use the result evaluated by the first satellite network, or be determined according to the information from the second satellite network in the first handover command sent by the first satellite network.

Optionally, when the terminal device calculates $PL_{b,f,c}(q_d)$, it can use the RS resource from the SS/PBCH block. The index of the SS/PBCH block is the same as the index of the SS/PBCH block of a master information block (MIB) obtained by the terminal device.

Optionally, when the terminal device calculates $PL_{b,f,c}(q_d)$, it can use the RS resources from the SS/PBCH block. The index of the SS/PPBCH block corresponding to the RS resource is the same as the index of the SS/PBCH block used by the terminal device to monitor the PDCCH dynamic scheduling UL-grant. The UL-grant dynamically scheduled by the PDCCH is used for the initial transmission.

$\Delta_{TF,b,c,f}(i)$ can be determined by a value of a preamble power ramping counter (PREAMBLE_POWER_RAMPING_COUNTER).

Optionally, $f_{b,f,c}(i, l)$ represents the PUSCH power control adjustment state of the uplink bandwidth part b corresponding to the carrier wave f of the first satellite network in the PUSCH transmission opportunity i. The valve of the power control adjustment state is included in the value of the transmit power control (TPC) command in the downlink control information (DCI) format. The value of the power control adjustment state value can also be jointly encoded with other TPC commands in the DCI format 2_2. The cyclic redundancy check (CRC) is scrambled by the TPC-PUSCH-RNTI.

Optionally, $P_{0_{PUSCH,b,f,c}}(j)$ is the current transmission power value of the terminal device. If the terminal device is in the RRC connected state, the handover request acknowledge information sent by the second satellite network to the first satellite network may include ConfiguredGrantConfig information sent by the second satellite network to the terminal device. The information includes resources, beam indexes, and parameters such as the average path loss or the maximum path loss in the second satellite network.

A method for determining the first power is described in combination with the second path loss compensation factor K. As can be seen from the above, the first handover command can be a RACH-less handover command. When the satellite handover is the RACH-less handover, the preamble power ramping counter described above cannot determine the power adjustment amount of the second satellite network. The power increase in the preamble power ramping counter is related to the PUSCH and/or the PRACH of the msgA in the first satellite network. The PUSCH and/or PRACH of the msgA in the first satellite network use the same spatial domain transmission beam. However, the parameters in the second satellite network cannot be associated with the counter.

In order to solve the problem, a new power adjustment counter P can be used. The power adjustment counter P can be a counter corresponding to RACH-less and can be used to determine the power adjustment amount in the first power. In some embodiments, a value of the power adjustment counter P is related to the parameters of the terminal device accessing the first satellite network. In some embodiments, a value of the power adjustment counter P is related to the number of random accesses of the terminal device. Exemplarily, a value of the power adjustment counter P is the number of accesses for the terminal device to establish a connection with the first satellite network.

In some embodiments, the power adjustment amount in the first power can also be determined according to a power adjustment factor. For example, the power adjustment factor is N, and a value of N is a positive integer greater than 1.

Exemplarily, the power adjustment factor N can be determined according to a service type of the terminal device. That is to say, N is related to the service type. For example, the higher the requirement for quality of service (QOS) is, the larger the value of N is.

Exemplarily, during the handover, the power adjustment amount in the first satellite network cannot be continued to be used. In order to ensure that the terminal device can smoothly hand over to the second satellite network, the transmission power in this case needs to be relatively high. Although it may cause certain interference to other nearby terminal devices, it can ensure the access success rate. After the terminal device sends the information indicating a successful handover, that is, when the terminal device has established a communication link with the second satellite network, the transmission power of the terminal device decreases accordingly. Even if the TPC adjustment command in the PDCCH is not received, the terminal device reduces its own transmission power according to the new power adjustment counter.

The method for determining the power adjustment factor N is described above. According to the value of N, the first power of the terminal device can be determined. Exemplarily, the first power $P_{PUSCH,b,f,c}$ for the terminal device to perform the uplink transmission on an uplink bandwidth b of a carrier wave f in a serving cell c can be determined according to the following formula:

$$P_{PUSCH,b,f,c}(i, j, q_d, l) = $$

$$\min \begin{cases} P_{CMAX,f,c}(i) \\ P_{0_{PUSCH,b,f,c}}(j) + 10\log_{10}\left(2^{\mu} * M_{RB,b,f,c}^{PUSCH}(i)\right) + \\ \alpha_{b,f,c}(j) * PL_{b,f,c}(q_d) + N * \Delta_{TF,b,c,f}(i) + f_{b,f,c}(i, l) \end{cases}$$

N represents the power adjustment factor, and N is greater than 1. Other parameters have been introduced above and are not repeated herein.

Optionally, the first power of the terminal device can comprehensively consider the path loss and the power adjustment amount. Exemplarily, the first power $P_{PUSCH,b,f,c}$ for the terminal device to perform the uplink transmission on an uplink bandwidth b of a carrier wave f in a serving cell c can be determined according to the following formula:

$$P_{PUSCH,b,f,c}(i, j, q_d, l) = $$

$$\min \begin{cases} P_{CMAX,f,c}(i) \\ P_{0_{PUSCH,b,f,c}}(j) + 10\log_{10}\left(2^{\mu} * M_{RB,b,f,c}^{PUSCH}(i)\right) + \\ K * \alpha_{b,f,c}(j) * PL_{b,f,c}(q_d) + N * \Delta_{TF,b,c,f}(i) + f_{b,f,c}(i, l) \end{cases}$$

K represents the second path loss compensation factor, and N represents the power adjustment factor.

The method embodiments of the present disclosure have been described in detail above in combination with FIG. 1 to FIG. 8. The device embodiments of the present disclosure will be described in detail in combination with FIG. 9 to FIG. 15 below. It should be understood that the descriptions of the device embodiments correspond to the description of the method embodiments. Therefore, for the parts that are not described in detail, reference may be made to the previous method embodiments.

FIG. 9 is a schematic block diagram of a terminal device according to an embodiment of the present disclosure. The terminal device 900 can be any of the terminal devices described above. The terminal device 900 shown in FIG. 9 includes a sending unit 910 and a first receiving unit 920.

The sending unit 910 is configured to send first information. The first information is used by the second satellite network to determine a first beam corresponding to the terminal device, and the first beam includes at least one beam. The first beam is related to a first resource and/or a second resource pre-configured by the second satellite network for satellite handover.

The first receiving unit 920 is configured to receive a first handover command. The first handover command is configured to instruct the terminal device to perform the satellite handover from a coverage area of a first satellite network to a coverage area of the second satellite network.

Optionally, the first handover command includes at least one of the following information: a grant pre-allocated by the second satellite network; the first source pre-configured by the second satellite network; a beam index associated with a synchronization signal block in the second satellite network; a maximum signal quality reported in the coverage area received by the second satellite network and a beam index associated with the maximum signal quality; a beam index associated with a specified signal quality reported in the coverage area received by the second satellite network; an average value of admission power of terminal devices other than the terminal device in the second satellite network; and a maximum value of admission power of terminal devices other than the terminal device in the second satellite network. Optionally, the first information includes a plurality of first measurement results of the terminal device measuring reference signals of a plurality of beams of the second satellite network, and the plurality of first measurement results are configured to determine the first beam.

Optionally, a first measurement result corresponding to the first beam is a maximum value among the plurality of first measurement results, or largest M values among the plurality of first measurement results.

Optionally, a first measurement result corresponding to the first beam is greater than a first threshold.

Optionally, the first resource is a reserved resource for the satellite handover, the second resource is a scheduled uplink resource, and the uplink source is used by the terminal device to perform the satellite handover.

Optionally, the first receiving unit 920 is further configured to receive second information after sending the first information, where the second information is configured to indicate the first beam. The terminal device 900 further includes: a second receiving unit, configured to detect a downlink channel sent by the second satellite network according to the first beam in response to receiving the first handover command.

Optionally, the first beam is indicated by an identifier of a reference signal associated with the first beam.

Optionally, the satellite handover is a RACH-less handover, the second satellite network is a satellite network meeting a RACH-less handover condition, and the sending unit 910 is further configured to send a first measurement report before sending the first information. The first measurement report is used by the first satellite network to determine the second satellite network among a plurality of candidate satellite networks. The first measurement report includes a plurality of second measurement results of the terminal device measuring reference signals of the plurality of candidate satellite networks.

Optionally, a second measurement result corresponding to the second satellite network is a maximum value among the plurality of second measurement results, or one of the plurality of second measurement results greater than or equal to a second threshold.

Optionally, the reference signals include a synchronization signal block reference signal SSB-RS and/or a channel state information reference signal CSI-RS.

Optionally, the first beam is configured to carry at least one synchronization signal block for the terminal device to perform the satellite handover, and the at least one synchronization signal block is associated with the first resource.

Optionally, the first handover command is a RACH-less handover command.

Optionally, the satellite handover is performed under meeting a first condition, the first handover command includes parameters of a plurality of candidate satellite networks, the first resource includes a plurality of uplink grants, and the terminal device 900 further includes: a first determination unit, configured to determine the second satellite network among the plurality of candidate satellite networks; and a second determination unit, configured to determine an uplink grant for the terminal device to perform the satellite handover among the plurality of uplink grants.

Optionally, the sending unit 910 is further configured to send third information to the first satellite network, where the third information is configured to indicate the first condition. The third information includes at least one of the following information: a handover condition associated with at least one candidate satellite network based on the SSB-RS; a handover condition associated with at least one candidate satellite network based on the CSI-RS; a measurement result/measurement information of at least one SSB-RS or at least one CSI-RS; and at least one SSB-RS or at least one CSI-RS associated with a contention-less random access resource.

FIG. 10 is a schematic block diagram of a network device according to an embodiment of the present disclosure. The network device 1000 can be any network device corresponding to the first satellite network described above. The network device 1000 shown in FIG. 10 includes a receiving unit 1010, a first transmitting unit 1020, and a second transmitting unit 1030.

The receiving unit 1010 is configured to receive first information sent by a terminal device.

The first sending unit 1020 is configured to send the first information to the second satellite network. The first information is used by the second satellite network to determine a first beam corresponding to the terminal device, and the first beam includes at least one beam. The first beam is related to a first resource and/or a second resource preconfigured by the second satellite network for the satellite handover.

The second sending unit 1030 is configured to send a first handover command to the terminal device. The first handover command is configured to instruct the terminal device to perform the satellite handover from a coverage area of the first satellite network to a coverage area of the second satellite network.

Optionally, the first handover command includes at least one of the following information: a grant pre-allocated by the second satellite network; the first source pre-configured by the second satellite network; a beam index associated with a synchronization signal block in the second satellite network; a maximum value of signal quality in the coverage area received by the second satellite network; an average value of signal quality in the coverage area received by the second satellite network; an average value of admission power of terminal devices other than the terminal device in the second satellite network; and a maximum value of admission power of terminal devices other than the terminal device in the second satellite network.

Optionally, the first resource is a reserved resource for the satellite handover, the second resource is a scheduled uplink resource, and the uplink source is used by the terminal device to perform the satellite handover.

Optionally, the receiving unit 1010 is further configured to receive second information sent by the second satellite network after sending the first information to the second satellite network, the first sending unit 1020 is further configured to send the second information to the terminal device, and the second information is configured to indicate the first beam.

Optionally, the satellite handover is a random access channel (RACH)-less handover, and the second satellite network is a satellite network meeting a RACH-less handover condition, the receiving unit 1010 is further configured to receive a first measurement report sent by the terminal device before receiving the first information sent by the terminal device. The first measurement report is used by the first satellite network to determine the second satellite network meeting the RACH-less handover condition among a plurality of candidate satellite networks. The first measurement report includes a plurality of second measurement results of the terminal device measuring reference signals of the plurality of candidate satellite networks.

Optionally, a second measurement result corresponding to the second satellite network is a maximum value among the plurality of second measurement results, or one of the plurality of second measurement results greater than or equal to a second threshold.

Optionally, the reference signals include a synchronization signal block reference signal SSB-RS and/or a channel state information reference signal CSI-RS.

Optionally, the first handover command is a RACH-less handover command.

Optionally, the satellite handover is performed under meeting a first condition, the first handover command includes parameters of a plurality of candidate satellite networks, and the receiving unit 1010 is further configured to receive third information sent by the terminal device. The third information is configured to indicate the first condition. The third information includes at least one of the following information: a handover condition associated with at least one candidate satellite network based on SSB-RS; a handover condition associated with at least one candidate satellite network based on CSI-RS; a measurement result/ measurement information of at least one SSB-RS or at least one CSI-RS; and at least one SSB-RS or at least one CSI-RS associated with a contention-less random access resource.

FIG. 11 is a schematic block diagram of another network device according to an embodiment of the present disclosure. The network device 1100 can be any network device corresponding to the second satellite network described above. The network device 1100 shown in FIG. 11 includes a receiving unit 1110 and a first sending unit 1120.

The receiving unit 1110 is configured to receive first information sent by a first satellite network, where the first information is used by the second satellite network to determine a first beam corresponding to a terminal device, and the first beam includes at least one beam. The first beam is related to a first resource and/or a second resource pre-configured by the second satellite network for a satellite handover.

The first sending unit 1120 is configured to send a handover request acknowledge to the first satellite network according to a handover request sent by the first satellite network. The handover request acknowledge is used by the first satellite network to send a first handover command to the terminal device, and the first handover command is configured to instruct the terminal device to perform the satellite handover from a coverage area of the first satellite network to a coverage area of the second satellite network.

Optionally, the first handover command includes at least one of the following information: a grant pre-allocated by the second satellite network; the first source pre-configured by the second satellite network; a beam index associated with a synchronization signal block in the second satellite network; a maximum value of signal quality in the coverage area received by the second satellite network; an average value of signal quality in the coverage area received by the second satellite network; an average value of admission power of terminal devices other than the terminal device in the second satellite network; and a maximum value of admission power of terminal devices other than the terminal device in the second satellite network.

Optionally, the first information includes a plurality of first measurement results of the terminal device measuring reference signals of a plurality of beams of the second satellite network, and the plurality of first measurement results are configured to determine the first beam.

Optionally, a first measurement result corresponding to the first beam is a maximum value among the plurality of first measurement results, or largest M values among the plurality of first measurement results.

Optionally, a first measurement result corresponding to the first beam is greater than a first threshold.

Optionally, the first resource is a reserved resource for the satellite handover, the second resource is a scheduled uplink resource, and the uplink source is used by the terminal device to perform the satellite handover.

Optionally, the first sending unit 1120 is further configured to send second information to the first satellite network after receiving the first information sent by the first satellite network, where the second information is configured to indicate the first beam. The network device 1100 further includes: a second sending unit, configured to send a downlink channel according to the first beam in response to sending the handover request acknowledge to the first satellite network.

Optionally, the first beam is indicated by an identifier of a reference signal associated with the first beam.

Optionally, the reference signals include a synchronization signal block reference signal SSB-RS and/or a channel state information reference signal CSI-RS.

Optionally, the first beam is configured to carry at least one synchronization signal block for the terminal device to perform the satellite handover, and the at least one synchronization signal block is associated with the first resource.

Optionally, the first handover command is a RACH-less handover command.

FIG. 12 is a schematic block diagram of another terminal device according to an embodiment of the present disclosure. The terminal device 1200 can be any of the terminal devices described above. The terminal device 1200 shown in FIG. 12 includes a receiving unit 1210 and a determination unit 1220.

The receiving unit 1210 is configured to receive a first handover command, and the first handover command is configured to indicate the terminal device to perform a satellite handover from a coverage area of a first satellite network to a coverage area of a second satellite network. The first handover command includes power-related information in the coverage area of the second satellite network, and/or relative position information between a second satellite corresponding to the second satellite network and the terminal device.

The determination unit 1220 is configured to determine first power for an uplink transmission to the second satellite network according to the first handover command.

Optionally, the power-related information in the coverage area of the second satellite network includes one or more of the following parameters: an average value of signal quality of a portion or all of the accessed uplink beams in the area; a maximum value of signal quality of a portion or all of the accessed uplink beams in the area; transmission power of sending a random access uplink channel by at least a portion of accessed terminal devices in the area; an average value of admission power of terminal devices other than the terminal device in the second satellite network; a maximum value of admission power of terminal devices other than the terminal device in the second satellite network; an average path loss in the coverage area of the second satellite network; and a maximum path loss in the coverage area of the second satellite network.

Optionally, the first power is determined according to the power-related information and maximum output power of the terminal device.

Optionally, the signal quality is at least one of RSRP, RSRQ, and RSSI.

Optionally, the transmission power of sending the random access channel by at least the portion of the accessed terminal devices in the area includes one or more of the following: transmission power of sending message A by the at least portion of the terminal devices; and transmission power of sending message 3 by the at least portion of the terminal devices.

Optionally, the relative position information is configured to determine a path loss compensation factor of the terminal device in the second satellite network, and the relative position information includes one or more of the following information: a distance between the terminal device and the second satellite; and a direction angle between the terminal device and the second satellite.

Optionally, the path loss compensation factor is determined according to the direction angle between the terminal device and the second satellite, and the path loss compensation factor K is determined according to the following formula:

$$K = \frac{\cos\delta 1}{\cos\delta 2}.$$

$\delta 1$ represents the direction angle between the terminal device and the first satellite corresponding to the first satellite network, and $\delta 2$ represents the direction angle between the terminal device and the second satellite corresponding to the second satellite network.

Optionally, the first power $P_{PUSCH,b,f,c}$ for the terminal device to perform the uplink transmission on an uplink bandwidth b of a carrier wave f in a serving cell c can be determined according to the following formula:

$$P_{PUSCH,b,f,c}(i, j, q_d, l) = \min\begin{cases} P_{CMAX,f,c}(i) \\ P_{0\,PUSCH,b,f,c}(j) + 10\log_{10}\left(2^{\mu} * M_{RB,b,f,c}^{PUSCH}(i)\right) + K *. \\ \alpha_{b,f,c}(j) * PL_{b,f,c}(q_d) + \Delta_{TF,b,c,f}(i) + f_{b,f,c}(i, l) \end{cases}$$

i represents transmission opportunity, j represents an index of a parameter set configuration, $q_d$ represents an index of the reference signal, l represents an index of the power control adjustment state, $\mu$ is related to the subcarrier wave spacing, $P_{CMAX,f,c}$ (i) represents the maximum output power of the terminal device in the second satellite network, $P_{0_{PUSCH,b,f,c}}$(j) represents the current transmission power of the terminal device in the first satellite network, $$M_{RB,b,f,c}^{PUSCH}(i)$$

represents the uplink resource bandwidth, $\alpha_{b,f,c}$(j) represents the path loss compensation factor of the terminal device in the first satellite network, $PL_{b,f,c}$($q_d$) represents the downlink path loss, $\Delta_{TF,b,c,f}$(i) represents the power adjustment amount, and $f_{b,f,c}$(i, l) represents the power control adjustment state.

Optionally, the first handover command is a RACH-less handover command. The power adjustment amount in the first power is determined according to a RACH-less power adjustment counter, and a value of the power adjustment counter is related to parameters of the terminal device accessing the first satellite network.

Optionally, the value of the power adjustment counter is the number of accesses for the terminal device to establish a connection with the first satellite network.

Optionally, the power adjustment amount is further determined according to a power adjustment factor, which is determined according to a service type of the terminal device.

Optionally, the first power $P_{PUSCH,b,f,c}$ for the terminal device to perform the uplink transmission on an uplink bandwidth b of a carrier wave f in a serving cell c can be determined according to the following formula:

$$P_{PUSCH,b,f,c}(i, j, q_d, l) = \min\begin{cases} P_{CMAX,f,c}(i) \\ P_{0\,PUSCH,b,f,c}(j) + 10\log_{10}\left(2^{\mu} * M_{RB,b,f,c}^{PUSCH}(i)\right) + \alpha_{b,f,c}(j) *. \\ \alpha_{b,f,c}(j) * PL_{b,f,c}(q_d) + N * \Delta_{TF,b,c,f}(i) + f_{b,f,c}(i, l) \end{cases}$$

N represents the power adjustment factor, and N is greater than 1.

Optionally, the first power $P_{PUSCH,b,f,c}$ for the terminal device to perform the uplink transmission on an uplink bandwidth b of a carrier wave fin a serving cell c can be determined according to the following formula:

$$P_{PUSCH,b,f,c}(i,j,q_d,l) = \min \begin{cases} P_{CMAX,f,c}(i) \\ P_{0\,PUSCH,b,f,c}(j) + 10\log_{10}\left(2^{\mu} * M_{RB,b,f,c}^{PUSCH}(i)\right) + K * \\ \alpha_{b,f,c}(j) * PL_{b,f,c}(q_d) + N * \Delta_{TF,b,c,f}(i) + f_{b,f,c}(i,l) \end{cases}$$

K represents the second path loss compensation factor, and N represents the power adjustment factor.

FIG. 13 is a schematic block diagram of another network device according to an embodiment of the present disclosure. The network device 1300 can be any of the network devices corresponding to the first satellite network described above. The network device 1300 shown in FIG. 13 includes a determination unit 1310 and a sending unit 1310.

The determination unit 1310 is configured to determine a first handover command according to a handover request acknowledge sent by a second satellite network, and the first handover command is configured to indicate the terminal device to perform a satellite handover from a coverage area of the first satellite network to a coverage area of the second satellite network. The first handover command includes power-related information in the coverage area of the second satellite network, and/or relative position information between a second satellite corresponding to the second satellite network and the terminal device.

The sending unit 1320 is configured to send the first handover command to the terminal device. The first handover command is used by the terminal device to determine first power for an uplink transmission to the second satellite network.

Optionally, the power-related information in the coverage area of the second satellite network includes one or more of the following parameters: an average value of signal quality of a portion or all of the accessed uplink beams in the area; a maximum value of signal quality of a portion or all of the accessed uplink beams in the area; transmission power of sending a random access uplink channel by at least a portion of accessed terminal devices in the area; an average value of admission power of terminal devices other than the terminal device in the second satellite network; a maximum value of admission power of terminal devices other than the terminal device in the second satellite network; an average path loss in the coverage area of the second satellite network; and a maximum path loss in the coverage area of the second satellite network.

Optionally, the first power is determined according to the power-related information and maximum output power of the terminal device.

Optionally, the signal quality is at least one of RSRP, RSRQ, and RSSI.

Optionally, the transmission power of sending the random access channel by at least the portion of the accessed terminal devices in the area includes one or more of the following: transmission power of sending message A by the at least portion of the terminal devices; and transmission power of sending message 3 by the at least portion of the terminal devices.

Optionally, the relative position information is configured to determine a path loss compensation factor of the terminal device in the second satellite network, and the relative position information includes one or more of the following information: a distance between the terminal device and the second satellite; and a direction angle between the terminal device and the second satellite.

Optionally, the path loss compensation factor is determined according to the direction angle between the terminal device and the second satellite, and the path loss compensation factor K is determined according to the following formula:

$$K = \frac{\cos\delta 1}{\cos\delta 2}.$$

δ1 represents the direction angle between the terminal device and the first satellite corresponding to the first satellite network, and δ2 represents the direction angle between the terminal device and the second satellite corresponding to the second satellite network.

Optionally, the first power $P_{PUSCH,b,f,c}$ for the terminal device to perform the uplink transmission on an uplink bandwidth b of a carrier wave f in a serving cell c can be determined according to the following formula:

$$P_{PUSCH,b,f,c}(i,j,q_d,l) = \min \begin{cases} P_{CMAX,f,c}(i) \\ P_{0\,PUSCH,b,f,c}(j) + 10\log_{10}\left(2^{\mu} * M_{RB,b,f,c}^{PUSCH}(i)\right) + K * \\ \alpha_{b,f,c}(j) * PL_{b,f,c}(q_d) + \Delta_{TF,b,c,f}(i) + f_{b,f,c}(i,l) \end{cases}$$

i represents transmission opportunity, j represents an index of a parameter set configuration, $q_d$ represents an index of the reference signal, l represents an index of the power control adjustment state, μ is related to the subcarrier wave spacing, $P_{CMAX,f,c}(i)$ represents the maximum output power of the terminal device in the second satellite network, $P_{0\,PUSCH,b,f,c}(j)$ represents the current transmission power of the terminal device in the first satellite network, $$M_{RB,b,f,c}^{PUSCH}(i)$$

represents the uplink resource bandwidth, $\alpha_{b,f,c}(j)$ represents the path loss compensation factor of the terminal device in the first satellite network, $PL_{b,f,c}(q_d)$ represents the downlink path loss, $\Delta_{TF,b,c,f}(i)$ represents the power adjustment amount, and $f_{b,f,c}(i,l)$ represents the power control adjustment state.

Optionally, the first handover command is a RACH-less handover command. The power adjustment amount in the first power is determined according to a RACH-less power adjustment counter, and a value of the power adjustment counter is related to parameters of the terminal device accessing the first satellite network.

Optionally, the value of the power adjustment counter is the number of accesses for the terminal device to establish a connection with the first satellite network.

Optionally, the power adjustment amount is further determined according to a power adjustment factor, which is determined according to a service type of the terminal device.

Optionally, the first power $P_{PUSCH,b,f,c}$ for the terminal device to perform the uplink transmission on an uplink bandwidth b of a carrier wave f in a serving cell c can be determined according to the following formula:

$$P_{PUSCH,b,f,c}(i, j, q_d, l) = \min \left\{ \begin{array}{l} P_{CMAX,f,c}(i) \\ P_{0\,PUSCH,b,f,c}(j) + 10\log_{10}\left(2^{\mu} * M_{RB,b,f,c}^{PUSCH}(i)\right) + \\ \alpha_{b,f,c}(j) * PL_{b,f,c}(q_d) + N * \Delta_{TF,b,c,f}(i) + f_{b,f,c}(i, l) \end{array} \right. .$$

N represents the power adjustment factor, and N is greater than 1.

Optionally, the first power $P_{PUSCH,b,f,c}$ for the terminal device to perform the uplink transmission on an uplink bandwidth b of a carrier wave f in a serving cell c can be determined according to the following formula:

$$P_{PUSCH,b,f,c}(i, j, q_d, l) = \min \left\{ \begin{array}{l} P_{CMAX,f,c}(i) \\ P_{0\,PUSCH,b,f,c}(j) + 10\log_{10}\left(2^{\mu} * M_{RB,b,f,c}^{PUSCH}(i)\right) + K * \\ \alpha_{b,f,c}(j) * PL_{b,f,c}(q_d) + N * \Delta_{TF,b,c,f}(i) + f_{b,f,c}(i, l) \end{array} \right. .$$

K represents the path loss compensation factor, and N represents the power adjustment factor.

FIG. 14 is a schematic block diagram of another network device according to an embodiment of the present disclosure. The network device 1400 can be any of the network devices corresponding to the second satellite network described above. The network device 1400 shown in FIG. 14 includes a sending unit 1410.

The sending unit 1410 is configured to send a handover request acknowledge to a first satellite network. The handover request acknowledge is used by the first satellite network to determine a first handover command. The first handover command is configured to indicate the terminal device to perform a satellite handover from a coverage area of the first satellite network to a coverage area of a second satellite network.

The first handover command includes power-related information in the coverage area of the second satellite network, and/or relative position information between the second satellite corresponding to the second satellite network and the terminal device. The first handover command is used by the terminal device to determine first power for an uplink transmission to the second satellite network.

Optionally, the power-related information in the coverage area of the second satellite network includes one or more of the following parameters: an average value of signal quality of a portion or all of the accessed uplink beams in the area; a maximum value of signal quality of a portion or all of the accessed uplink beams in the area; transmission power of sending a random access uplink channel by at least a portion of accessed terminal devices in the area; an average value of admission power of terminal devices other than the terminal device in the second satellite network; a maximum value of admission power of terminal devices other than the terminal device in the second satellite network; an average path loss in the coverage area of the second satellite network; and a maximum path loss in the coverage area of the second satellite network Optionally, the first power is determined according to the power-related information and maximum output power of the terminal device.

Optionally, the signal quality is at least one of RSRP, RSRQ, and RSSI.

Optionally, the transmission power of sending the random access channel by at least the portion of the accessed terminal devices in the area includes one or more of the following: transmission power of sending message A by the at least portion of the terminal devices; and transmission power of sending message 3 by the at least portion of the terminal devices.

Optionally, the relative position information is configured to determine a path loss compensation factor of the terminal device in the second satellite network, and the relative position information includes one or more of the following information: a distance between the terminal device and the second satellite; and a direction angle between the terminal device and the second satellite.

Optionally, the path loss compensation factor is determined according to the direction angle between the terminal device and the second satellite, and the path loss compensation factor K is determined according to the following formula:

$$K = \frac{\cos\delta 1}{\cos\delta 2}.$$

δ1 represents the direction angle between the terminal device and the first satellite corresponding to the first satellite network, and δ2 represents the direction angle between the terminal device and the second satellite corresponding to the second satellite network.

Optionally, the first power $P_{PUSCH,b,f,c}$ for the terminal device to perform the uplink transmission on an uplink bandwidth b of a carrier wave f in a serving cell c can be determined according to the following formula:

$$P_{PUSCH,b,f,c}(i, j, q_d, l) = \min \left\{ \begin{array}{l} P_{CMAX,f,c}(i) \\ P_{0\,PUSCH,b,f,c}(j) + 10\log_{10}\left(2^{\mu} * M_{RB,b,f,c}^{PUSCH}(i)\right) + K * \\ \alpha_{b,f,c}(j) * PL_{b,f,c}(q_d) + \Delta_{TF,b,c,f}(i) + f_{b,f,c}(i, l) \end{array} \right. .$$

i represents transmission opportunity, j represents an index of a parameter set configuration, d represents an index of the reference signal, l represents an index of the power control adjustment state, μ is related to the subcarrier wave spacing, $P_{CMAX,f,c}$ (i) represents the maximum output power of the terminal device in the second satellite network, $P_{0\,PUSCH,b,f,c}$(j) represents the current transmission power of the terminal device in the first satellite network, $$M_{RB,b,f,c}^{PUSCH}(i)$$

US 12,666,322 B2

43 represents the uplink resource bandwidth, $\alpha_{b,f,c}(j)$ represents the path loss compensation factor of the terminal device in the first satellite network, $PL_{b,f,c}(q_d)$ represents the downlink path loss, $\Delta_{TF,b,c,f}(i)$ represents the power adjustment amount, and $f_{b,f,c}(i, 1)$ represents the power control adjustment state.

Optionally, the first handover command is a RACH-less handover command. The power adjustment amount in the first power is determined according to a RACH-less power adjustment counter, and a value of the power adjustment counter is related to parameters of the terminal device accessing the first satellite network.

Optionally, the value of the power adjustment counter is the number of accesses for the terminal device to establish a connection with the first satellite network.

Optionally, the power adjustment amount is further determined according to a power adjustment factor, which is determined according to a service type of the terminal device.

Optionally, the first power $P_{PUSCH,b,f,c}$ for the terminal device to perform the uplink transmission on an uplink bandwidth b of a carrier wave f in a serving cell c can be determined according to the following formula:

$$P_{PUSCH,b,f,c}(i, j, q_d, l) = \min\begin{cases} P_{CMAX,f,c}(i) \\ P_{0\,PUSCH,b,f,c}(j) + 10\log_{10}(2^\mu * M_{RB,b,f,c}^{PUSCH}(i)) + \\ \alpha_{b,f,c}(j) * PL_{b,f,c}(q_d) + N * \Delta_{TF,b,c,f}(i) + f_{b,f,c}(i, l) \end{cases}.$$

N represents the power adjustment factor, and N is greater than 1.

Optionally, the first power $P_{PUSCH,b,f,c}$ for the terminal device to perform the uplink transmission on an uplink bandwidth b of a carrier wave fin a serving cell c can be determined according to the following formula:

$$P_{PUSCH,b,f,c}(i, j, q_d, l) = \min\begin{cases} P_{CMAX,f,c}(i) \\ P_{0\,PUSCH,b,f,c}(j) + 10\log_{10}(2^\mu * M_{RB,b,f,c}^{PUSCH}(i)) + K * \\ \alpha_{b,f,c}(j) * PL_{b,f,c}(q_d) + N * \Delta_{TF,b,c,f}(i) + f_{b,f,c}(i, l) \end{cases}.$$

K represents the path loss compensation factor, and N represents the power adjustment factor.

Figure 15:
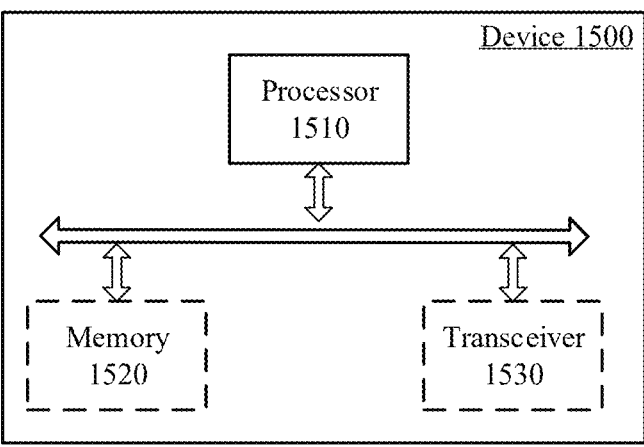
FIG. 15 is a schematic structural diagram of a communication device according to an embodiment of the present disclosure.

FIG. 15 shows a schematic structural diagram of a communication device according to an embodiment of the present disclosure. The dashed lines in FIG. 15 indicate that the units or modules are optional. The device 1500 can be used to implement the method described in the above method embodiments. The device 1500 can be a chip, a terminal device, or a network device.

The device 1500 may include at least one processor 1510. The at least one processor 1510 can support the device 1500 to implement the method described in the above embodiments for the method. The at least one processor 1510 may be a general-purpose processor or a special-purpose processor. For example, the processor is a central processing unit (CPU). Alternatively, the processor may be other general-purpose processor, a digital signal processor (DSP), an application specific integrated circuits (ASIC), a field programmable gate array (FPGA) or other programmable logic device, a discrete gate or a transistor logic device, a discrete hardware component, etc. The general-purpose processor may be a microprocessor or the processor may be any conventional processor, etc.

The device 1500 further includes at least one memory 1520 storing a program. The program is executed by the processor 1510 to perform the method described in the above embodiments for the method. The memory 1520 is independent of or integrated in the processor 1510.

The device 1500 further includes a transceiver 1530. The processor 1510 communicates with other devices or chips via the transceiver 1530. For example, the processor 1510 transmits and receives data with other devices or chips via the transceiver 1530.

A computer-readable storage medium configured to store a program is provided by an embodiment of the present disclosure. The computer-readable storage medium is applicable to the terminal device or the network device provided by the embodiments of the present disclosure, and the program causes the computer to perform the method executed by the terminal device or the network device according to the embodiments of the present disclosure.

The computer-readable storage medium mentioned in the embodiments of the present disclosure can be any available medium that a computer can read or a data storage device, such as a server or a data center that integrates at least one available medium. The available medium may be a magnetic medium (e.g., a floppy disk, a hard disk, a magnetic tape), an optical medium (e.g., a digital video disc (DVD)) or a semiconductor medium (e.g., a solid state disk (SSD)).

A computer program product configured to store a program is provided by an embodiment of the present disclosure. The computer program product includes a program. The computer program product is applicable to the terminal device or the network device provided by the embodiments of the present disclosure, and the program causes the computer to perform the method executed by the terminal device or the network device according to the embodiments of the present disclosure.

The above embodiments can be implemented in whole or in part by software, hardware, firmware or any combination thereof. In case of being implemented in software, the embodiments can be fully or partially implemented in the form of a computer program product. The computer program product includes at least one computer instruction. When the at least one computer program instruction is loaded and executed on a computer, the flow or function described in the embodiments of the present disclosure is generated in whole or in part. The computer can be a general-purpose computer, a special-purpose computer, a computer network, or other programmable devices. The computer instruction can be stored in a computer-readable storage medium or transmitted from one computer-readable storage medium to another computer-readable storage medium. For example, the computer instruction can be transmitted from one website, computer, server or data center to another website, computer, server or data center by a wired way (such as a coaxial cable, an optical fiber, a digital subscriber line (DSL)), or a wireless way (such as infrared, wireless, microwave, etc.).

A computer program is further provided according to an embodiment of the present disclosure. The computer program can be applied to the terminal devices or the network devices provided in the embodiments of the present disclosure, and the computer program causes a computer to execute the methods executed by the terminal devices or the network devices in various embodiments of the present disclosure.

The terms "system" and "network" in the embodiments of the present disclosure may be used interchangeably. In addition, the terms used in the present disclosure are only used to explain the specific embodiment of the present disclosure, and are not intended to limit the present disclosure. The terms "first", "second", "third", and "fourth" used to are used to distinguish between different objects and are not intended to describe a particular order. In addition, the terms "include" and "have", and any variations thereof, are intended to cover non-exclusive inclusion.

In the embodiments of the present disclosure, the term "indicate" may be a direct indication, an indirect indication, or an association relationship. For example, A indicates to B, which can mean that A indicates to B directly, for example, B can be accessed through A, or it can mean that A indicates to B indirectly, for example, A indicates to C, and that B.

In the embodiments of the present disclosure, the term "correspond" can indicate a direct or indirect corresponding relationship between the two, or an associative relationship between the two, or a relationship between indicating and being indicated, or configuring and being configured, and the like.

In the embodiments of the present disclosure, "pre-defined" or "pre-configured" can be implemented by pre-saving corresponding codes, tables, or other means that can be used to indicate relevant information in devices (such as terminal devices and network devices), which is not limited by the present disclosure. For example, pre-defined can refer to being defined in a protocol.

In the embodiment of the present disclosure, the "protocol" may refer to a standard protocol in the communication field, including, for example, LTE protocol, NR protocol and related protocols applied in future communication systems, which is not limited by the present disclosure.

In the embodiments of the present disclosure, determining B according to A does not mean determining B only according to A, but also according to A and/or other information.

In the embodiments of the present disclosure, the term "and/or" is only an association relationship describing the associated objects, which means that there can be three relationships. For example, A and/or B, which can mean that there are three situations: A, A and B, and B. In addition, the character "/" herein generally indicates an "or" relationship between the associated objects.

In the embodiments of the present disclosure, the magnitude of the reference numerals of the above processes does not imply the order of execution, and the order of execution of the processes should be determined by its function and inherent logic, and should not constitute any limitation on the implementation process of the embodiments of the present disclosure.

In the embodiments of the present disclosure, it should be understood that the disclosed system, device and method can be realized in other ways. For example, the embodiments for the device described above are only schematic. For example, the division of the units is only a logical function division. In actual implementation, there may be other division methods, such as a plurality of units or components can be combined or integrated into another system, or some features can be ignored or not implemented. In addition, the coupling or direct coupling or communication connection shown or discussed can be indirect coupling or communication connection through some interfaces, devices or units, which can be electrical, mechanical or other forms.

The units described as separate components may or may not be physically separated, and the components displayed as units may or may not be physical units, that is, they may be located in one place or distributed to multiple network units. Some or all of the units can be selected according to actual needs to achieve the purpose of the embodiments of the present disclosure.

In addition, each respective functional unit in the embodiments of the present disclosure can be integrated into one processing unit, or each respective unit can exist physically, or two or more units can be integrated into one unit.

Through the description of the above embodiments, those skilled in the art can clearly understand that the above method embodiments can be implemented by means of software and a necessary general hardware platform or can also be implemented by hardware, but in many cases, the former is a better implementation. Based on such an understanding, the technical solution of the present disclosure, in essence, or the part that contributes to the prior art can be embodied in the form of a software product. The computer software product is stored in a storage medium (such as ROM/RAM, magnetic disk, optical disk), and includes several instructions for enabling a service classification device (which can be a mobile phone, a computer, a server, an air conditioner, or a network device, etc.) to execute the methods described in various embodiments of the present disclosure.

The above is only the specific embodiments of the present disclosure, but the protection scope of the present disclosure is not limited thereto. Any variations or substitutions that can be easily conceived by those skilled in the art within the technical scope disclosed by the present disclosure, should be included in the protection scope of the present disclosure. Therefore, the protection scope of the present disclosure should be based on the protection scope of the claims.

What is claimed is:

1. A method for non-terrestrial network satellite handover, comprising:

sending first information to a first satellite network, wherein the first information comprises a plurality of first measurement results of reference signals of a plurality of beams of a second satellite network, wherein the second satellite network is different from the first satellite network; and receiving a first handover command from the first satellite network, wherein the first handover command indicates a terminal device to perform a random access channel-less (RACH-less) satellite handover from a coverage area of the first satellite network to a coverage area of the second satellite network, wherein the first handover command comprises information of a first beam that includes a beam index of at least one beam of the second satellite network, wherein the first beam relates to one or more pre-configured resources for the RACH-less satellite handover.

2. The method according to claim 1, wherein the information of the first beam comprises a beam index corresponding to a synchronization signal block (SSB) of the second satellite network, and the beam index corresponds to the first beam.

3. The method according to claim 1, wherein the first handover command includes at least one of the following information:

a grant pre-allocated by the second satellite network;

a first resource pre-configured by the second satellite network;

a maximum signal quality reported in the coverage area received by the second satellite network and a beam index associated with the maximum signal quality;

a beam index associated with a specified signal quality reported in the coverage area received by the second satellite network;

an average value of admission power of terminal devices other than the terminal device in the second satellite network; or a maximum value of admission power of terminal devices other than the terminal device in the second satellite network.

4. The method according to claim 1, wherein a first measurement result corresponding to the first beam is a maximum value among the plurality of first measurement results, or largest M values among the plurality of first measurement results.

5. The method according to claim 1, wherein a first measurement result corresponding to the first beam is greater than a first threshold.

6. The method according to claim 1, wherein the one or more pre-configured resources comprise a first resource that is a reserved resource for the RACH-less satellite handover, and a second resource that is a scheduled uplink resource used to perform the RACH-less satellite handover.

7. The method according to claim 1, further comprising: detecting a downlink channel sent by the second satellite network according to the first beam in response to receiving the first handover command.

8. The method according to claim 1, wherein the first beam is indicated by an identifier of a reference signal associated with the first beam.

9. The method according to claim 1, wherein the reference signals include at least one of a synchronization signal block reference signal (SSB-RS) or a channel state information reference signal CSI-RS.

10. The method according to claim 1, wherein the first beam is configured to carry at least one synchronization signal block for the terminal device to perform the RACH-less satellite handover, and the at least one synchronization signal block is associated with a first resource of the one or more pre-configured resources.

11. The method according to claim 1, wherein the first handover command is a RACH-less handover command.

12. A method for non-terrestrial network satellite handover, comprising:

receiving, at a first satellite network, first information from a terminal device, wherein the first information comprises a plurality of first measurement results of reference signals of a plurality of beams of a second satellite network, wherein the second satellite network is different from the first satellite network;

sending the first information to the second satellite network; and sending, from the first satellite network, a first handover command to the terminal device, wherein the first handover command indicates the terminal device to perform a random access channel-less (RACH-less) satellite handover from a coverage area of the first satellite network to a coverage area of the second satellite network, wherein the first handover command comprises information of a first beam that includes a beam index of at least one beam of the second satellite network, wherein the first beam relates to one or more pre-configured resources for the RACH-less satellite handover.

13. The method according to claim 12, wherein the information of the first beam comprises a beam index corresponding to a synchronization signal block (SSB) of the second satellite network, and the beam index corresponds to the first beam.

14. The method according to claim 12, wherein the first handover command includes at least one of the following information:

a grant pre-allocated by the second satellite network;

a first resource pre-configured by the second satellite network;

a maximum signal quality reported in the coverage area received by the second satellite network and a beam index associated with the maximum signal quality;

a beam index associated with a specified signal quality reported in the coverage area received by the second satellite network;

an average value of admission power of terminal devices other than the terminal device in the second satellite network; or a maximum value of admission power of terminal devices other than the terminal device in the second satellite network.

15. The method according to claim 12, wherein a first measurement result corresponding to the first beam is a maximum value among the plurality of first measurement results, or largest M values among the plurality of first measurement results.

16. The method according to claim 12, wherein a first measurement result corresponding to the first beam is greater than a first threshold.

17. The method according to claim 12, wherein the one or more pre-configured resources comprise a first resource that is a reserved resource for the RACH-less satellite handover, and a second resource that is a scheduled uplink resource used to perform the RACH-less satellite handover.

18. A method for non-terrestrial network satellite handover, comprising:

receiving, at a second satellite network, first information from a first satellite network, wherein the second satellite network is different from the first satellite network;

determining, by the second satellite network, a first beam corresponding to a terminal device, and the first beam includes at least one beam; and sending information of the first beam to the first satellite network, wherein the first beam includes at least one beam, and the information of the first beam comprises a beam index of the at least one beam of the second satellite network, and wherein the first beam relates to one or more pre-configured resources for a RACH-less satellite handover.

19. The method according to claim 18, wherein the information of the first beam comprises a beam index corresponding to a synchronization signal block (SSB) of the second satellite network, and the beam index corresponds to the first beam.

* * * * *